(12) United States Patent
Crites et al.

(10) Patent No.: US 11,021,965 B2
(45) Date of Patent: Jun. 1, 2021

(54) ENGINE COMPONENTS WITH COOLING HOLES HAVING TAILORED METERING AND DIFFUSER PORTIONS

(71) Applicant: HONEYWELL INTERNATIONAL INC., Morris Plains, NJ (US)

(72) Inventors: Daniel C. Crites, Mesa, AZ (US); Mark C. Morris, Phoenix, AZ (US); David R. Waldman, Chandler, AZ (US); Ardeshir Riahi, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 916 days.

(21) Appl. No.: 15/158,904

(22) Filed: May 19, 2016

(65) Prior Publication Data

US 2017/0335691 A1 Nov. 23, 2017

(51) Int. Cl.
*F01D 5/18* (2006.01)
*F01D 9/06* (2006.01)
(Continued)

(52) U.S. Cl.
CPC .............. *F01D 5/186* (2013.01); *F01D 9/023* (2013.01); *F01D 9/065* (2013.01); *F02C 7/18* (2013.01);
(Continued)

(58) Field of Classification Search
CPC .......... F01D 5/186; F01D 9/023; F01D 9/065; F05D 2260/202; F05D 2240/81;
(Continued)

(56) References Cited

U.S. PATENT DOCUMENTS

| 4,461,612 A | 7/1984 | Dodd |
| 4,526,358 A | 7/1985 | Ura et al. |

(Continued)

FOREIGN PATENT DOCUMENTS

| EP | 0375175 A1 | 11/1989 |
| EP | 0648918 A1 | 4/1995 |

(Continued)

OTHER PUBLICATIONS

Wos, F.J.; Laser Hole-Shaping Improves Combustion Turbine Efficiency; May 1, 2010.

(Continued)

*Primary Examiner* — Kenneth Bomerg
*Assistant Examiner* — Jesse M Prager
(74) *Attorney, Agent, or Firm* — Lorenz & Kopf, LLP

(57) ABSTRACT

An engine component includes a body having an internal surface and an external surface, the internal surface at least partially defining an internal cooling circuit. The component further includes a plurality of cooling holes formed in the body and extending between the internal cooling circuit and the external surface of the body. The plurality of cooling holes includes a first cooling hole with a metering portion with a constant cross-sectional area and a cross-sectional shape having a maximum height that is offset relative to a longitudinal centerline of the metering portion; and a diffuser portion extending from the metering portion to the external surface of the body.

14 Claims, 16 Drawing Sheets

(51) Int. Cl.
*F02C 7/18* (2006.01)
*F23R 3/00* (2006.01)
*F02K 1/82* (2006.01)
*F01D 9/02* (2006.01)

(52) U.S. Cl.
CPC .............. *F02K 1/822* (2013.01); *F23R 3/002* (2013.01); *F05D 2240/11* (2013.01); *F05D 2240/81* (2013.01); *F05D 2250/712* (2013.01); *F05D 2250/713* (2013.01); *F05D 2250/72* (2013.01); *F05D 2250/75* (2013.01); *F05D 2260/202* (2013.01); *F23R 2900/03042* (2013.01)

(58) Field of Classification Search
CPC ........... F05D 2250/712; F05D 2250/75; F05D 2240/11; F05D 2250/713; F05D 2250/72; F02K 1/822; F23R 2900/03042; F23R 3/002; F02C 7/18
See application file for complete search history.

(56) References Cited

U.S. PATENT DOCUMENTS

| | | | |
|---|---|---|---|
| 4,529,358 A | 7/1985 | Papell | |
| 4,653,983 A | 3/1987 | Vehr | |
| 4,664,597 A | 5/1987 | Auxier et al. | |
| 4,684,323 A | 8/1987 | Field | |
| 4,729,799 A | 3/1988 | Henricks | |
| 4,738,588 A | 4/1988 | Field | |
| 5,062,768 A | 11/1991 | Marriage | |
| 5,096,379 A | 3/1992 | Stroud et al. | |
| 5,261,223 A | 11/1993 | Foltz | |
| 5,281,084 A | 1/1994 | Noe et al. | |
| 5,382,133 A | 1/1995 | Moore et al. | |
| 5,403,156 A | 4/1995 | Amess et al. | |
| 5,465,572 A | 11/1995 | Nicoll et al. | |
| 5,496,151 A | 3/1996 | Coudray et al. | |
| 5,511,937 A | 4/1996 | Papageorgiou | |
| 5,609,779 A | 3/1997 | Crow et al. | |
| 5,683,600 A | 11/1997 | Kelley et al. | |
| 5,747,769 A | 5/1998 | Rockstroh et al. | |
| 6,183,199 B1 | 2/2001 | Beeck et al. | |
| 6,243,948 B1 | 6/2001 | Lee et al. | |
| 6,329,015 B1 | 12/2001 | Fehrenbach et al. | |
| 6,368,060 B1 | 4/2002 | Fehrenbach et al. | |
| 6,420,677 B1 | 7/2002 | Emer et al. | |
| 6,554,571 B1 | 4/2003 | Lee et al. | |
| 6,568,187 B1 | 5/2003 | Jorgensen et al. | |
| 6,607,355 B2 | 8/2003 | Cunha et al. | |
| 6,616,406 B2 | 9/2003 | Liang | |
| 6,979,176 B2 | 12/2005 | Nakamata et al. | |
| 6,984,100 B2 | 1/2006 | Bunker et al. | |
| 7,131,814 B2 | 11/2006 | Nagler et al. | |
| 7,186,085 B2 | 3/2007 | Lee | |
| 7,186,091 B2 | 3/2007 | Lee et al. | |
| 7,246,992 B2 | 7/2007 | Lee | |
| 7,249,933 B2 | 7/2007 | Lee et al. | |
| 7,273,351 B2 | 9/2007 | Kopmels | |
| 7,328,580 B2 | 2/2008 | Lee et al. | |
| 7,351,036 B2 | 4/2008 | Liang | |
| 7,374,401 B2 | 5/2008 | Lee | |
| 7,540,712 B1 | 6/2009 | Liang | |
| 7,563,073 B1 | 7/2009 | Liang | |
| 7,625,180 B1 | 12/2009 | Liang | |
| 7,997,867 B1 | 8/2011 | Shih et al. | |
| 7,997,868 B1 | 8/2011 | Liang | |
| 8,057,179 B1 | 11/2011 | Liang | |
| 8,057,180 B1 | 11/2011 | Liang | |
| 8,057,181 B1 | 11/2011 | Liang | |
| 8,245,519 B1 | 8/2012 | Liang | |
| 8,371,814 B2 | 2/2013 | Ramachandran et al. | |
| 8,522,558 B1 | 9/2013 | Xu | |
| 8,529,193 B2 | 9/2013 | Venkataramanan et al. | |
| 8,572,983 B2 | 11/2013 | Xu | |
| 8,584,470 B2 | 11/2013 | Zelesky et al. | |
| 8,628,293 B2 | 1/2014 | Ramachandran et al. | |
| 8,850,828 B2 | 10/2014 | Mongillo, Jr. et al. | |
| 8,857,055 B2 | 10/2014 | Wei et al. | |
| 8,961,136 B1 | 2/2015 | Liang | |
| 2005/0023249 A1 | 2/2005 | Kildea | |
| 2005/0042074 A1 | 2/2005 | Liang | |
| 2005/0123401 A1 | 6/2005 | Bunker et al. | |
| 2005/0135931 A1 | 6/2005 | Nakamata et al. | |
| 2005/0232768 A1 | 10/2005 | Heeg et al. | |
| 2005/0286998 A1* | 12/2005 | Lee ...................... B23K 26/384 415/117 |
| 2006/0104807 A1 | 5/2006 | Lee | |
| 2006/0171807 A1 | 8/2006 | Lee | |
| 2006/0272335 A1 | 12/2006 | Schumacher et al. | |
| 2006/0277921 A1 | 12/2006 | Patel et al. | |
| 2007/0006588 A1 | 1/2007 | Patel et al. | |
| 2007/0128029 A1 | 6/2007 | Liang | |
| 2007/0234727 A1 | 10/2007 | Patel et al. | |
| 2008/0003096 A1 | 1/2008 | Kohli et al. | |
| 2008/0005903 A1 | 1/2008 | Trindade et al. | |
| 2008/0031738 A1 | 2/2008 | Lee | |
| 2008/0271457 A1 | 11/2008 | McMasters et al. | |
| 2009/0169394 A1 | 7/2009 | Crow et al. | |
| 2009/0246011 A1 | 10/2009 | Itzel | |
| 2010/0040459 A1 | 2/2010 | Ohkita | |
| 2010/0068032 A1 | 3/2010 | Liang | |
| 2010/0124484 A1 | 5/2010 | Tibbott et al. | |
| 2010/0303635 A1 | 12/2010 | Townes et al. | |
| 2010/0329846 A1 | 12/2010 | Ramachandran et al. | |
| 2011/0097188 A1 | 4/2011 | Bunker | |
| 2011/0097191 A1 | 4/2011 | Bunker | |
| 2011/0123312 A1 | 5/2011 | Venkataramanan et al. | |
| 2011/0217181 A1 | 9/2011 | Hada et al. | |
| 2011/0268584 A1 | 11/2011 | Mittendorf | |
| 2011/0293423 A1 | 12/2011 | Bunker et al. | |
| 2011/0311369 A1 | 12/2011 | Ramachandran et al. | |
| 2012/0051941 A1 | 3/2012 | Bunker | |
| 2012/0102959 A1 | 5/2012 | Starkweather | |
| 2012/0167389 A1 | 7/2012 | Lacy et al. | |
| 2013/0045106 A1 | 2/2013 | Lacy | |
| 2013/0115103 A1 | 5/2013 | Dutta et al. | |
| 2013/0205787 A1* | 8/2013 | Zelesky ............. F01D 5/186 60/722 |
| 2013/0205801 A1* | 8/2013 | Xu .................. F01D 5/186 60/806 |
| 2013/0209228 A1 | 8/2013 | Xu | |
| 2013/0209236 A1 | 8/2013 | Xu | |
| 2013/0294889 A1* | 11/2013 | Malak ............... F01D 5/186 415/115 |
| 2013/0315710 A1 | 11/2013 | Kollati et al. | |
| 2014/0099189 A1 | 4/2014 | Morris et al. | |
| 2014/0208771 A1 | 7/2014 | Koonankeil et al. | |
| 2014/0294598 A1 | 10/2014 | Nita et al. | |
| 2014/0338347 A1 | 11/2014 | Gage et al. | |
| 2014/0338351 A1 | 11/2014 | Snyder et al. | |
| 2015/0226433 A1 | 8/2015 | Dudebout et al. | |
| 2015/0369487 A1 | 12/2015 | Dierberger | |

FOREIGN PATENT DOCUMENTS

| | | |
|---|---|---|
| EP | 0924382 A2 | 6/1999 |
| EP | 0924384 A2 | 6/1999 |
| EP | 0992653 A1 | 4/2000 |
| EP | 1609949 A1 | 12/2005 |
| EP | 1892375 A1 | 2/2008 |
| EP | 1942251 A2 | 7/2008 |
| EP | 1970628 A2 | 9/2008 |
| EP | 2027963 A1 | 2/2009 |
| EP | 2666964 A2 | 11/2013 |
| EP | 2713010 A1 | 4/2014 |
| EP | 2815098 A1 | 12/2014 |
| EP | 2937513 A2 | 10/2015 |
| EP | 2985417 A2 | 2/2016 |
| EP | 3199762 A1 | 8/2017 |
| GB | 2409243 B | 11/2006 |
| JP | 07332005 | 12/1995 |
| JP | 2001012204 | 1/2001 |

(56) References Cited

FOREIGN PATENT DOCUMENTS

| | | | |
|---|---|---|---|
| JP | 2005090511 | 7/2005 | |
| JP | 2006307842 | 11/2006 | |
| JP | 2008248733 A | 10/2008 | |
| JP | 2012087809 A * | 5/2012 | ............ F01D 5/186 |
| WO | 2013133913 A1 | 8/2013 | |
| WO | 2013/165502 | 11/2013 | |
| WO | 2013/165509 A2 | 11/2013 | |
| WO | 2013165504 A2 | 11/2013 | |

OTHER PUBLICATIONS

USPTO Office Action, dated Oct. 3, 2014; U.S. Appl. No. 13/477,883.

EP Search Report for Application No. 13177511.6 dated Sep. 26, 2014.

USPTO Office Action for U.S. Appl. No. 13/477,883 dated Feb. 9, 2015.

EP Communication for EP 13 165 798.3—1610 dated Apr. 24, 2015.

EP Search Report for Application No. EP 13157092.1 Dated Jul. 10, 2015.

EP Examination Report for Application No. EP 13157092.1 Dated Jul. 21, 2015.

USPTO Office Action for U.S. Appl. No. 13/465,647 dated Mar. 1, 2016.

USPTO Notice of Allowance for U.S. Appl. No. 13/644,824 dated Feb. 26, 2016.

Colban, W., Thole, K.; Influence of Hole Shape on the Performance of a Turbine Vane Endwall Film-cooling Scheme, International Journal of Heat and Fluid Flow 28 (2007), pp. 341-356.

Gartshore, I., Salcudean, M., Hassan, I.: Film Cooling Injection Hole Geometry : Hole Shape Comparison for Compound Cooling Orientation, American Institute of Aeronautics and Astronautics, Reston, VA, 2001, vol. 39, No. 8, pp. 1493-1499.

Okita, Y., Nishiura, M.: Film Effectiveness Performance of an Arrowhead-Shaped Film Cooling Hole Geometry, ASME Conference Proceedings, ASME Turbo Expo 2006: Power for Land, Sea, and Air (GT2006), May 8-11, 2006 , Barcelona, Spain, vol. 3: Heat Transfer, Parts A and B, No. GT2006-90108, pp. 103-116.

Lu, Y., Allison, D., Ekkad, S. V.: Influence of Hole Angle and Shaping on Leading Edge Showerhead Film Cooling, ASME Turbo Expo 2006: Power for Land, Sea, and Air (GT2006), May 8-11, 2006 , Barcelona, Spain, vol. 3: Heat Transfer, Parts A and B, No. GT2006-90370 pp. 375-382.

Heidmann et al., A Novel Antivortex Turbine Film-Cooling Hole Concept, Journal of Turbomachinery, 2008 by ASME, Jul. 2008, vol. 130, pp. 031020-1-031020-9.

Final Office Action from U.S. Appl. No. 13/477,883 dated Jun. 29, 2016.

USPTO Office Action, dated Dec. 17, 2015; U.S. Appl. No. 13/477,883.

USPTO Office Action, dated Sep. 10, 2015; U.S. Appl. No. 13/644,824.

Loh, Teck Seng; Srigrarom, Sutthiphong; Investigative Study of Heat Transfer and Blades Cooling in the Gas Turbine, The Smithsonian/NASA Astrophysics Data System; Modern Physics Letters B, vol. 19, Issue 28-29, pp. 1611-1614 (2005).

Loh, Teck Seng; Srigrarom, Sutthiphong; Investigative Study of Heat Transfer and Blades Cooling in the Gas Turbine, Modern Physics Letters B, vol. 19m Issue 28-29, pp. 1611-1614 (2005).

Ronald S. Bunker; A Review of Shaped Hole Turbine Film-Cooling Technology; Journal of Heat Transfer, Apr. 2005, vol. 127, Issue 4, 441 (13 pages).

Shih, T.I.-P., NA, S.; Momentum—Preserving Shaped Holes for Film Cooling; ASME Conference Proceedings, Year 2007, ASME Turbo Expo 2007: Power for Land, Sea, and Air (GT2007), May 14-17, 2007, Montreal, Canada; vol. 4: Turbo Expo 2007, Parts A and B; Paper No. GT2007-27600, pp. 1377-1382.

Yiping Lu; Effect of Hole Configurations on Film Cooling From Cylindrical Inclined Holes for Application to Gas Turbine Blades, A Dissertation, Submitted to the Graduate Faculty of the Louisiana State University and Agricultural and Mechanical College, Dec. 2007.

Extended EP Search Report for Application No. 17167172.0-1610 dated Nov. 2, 2017.

EP Examination Report for Application No. 13177511.6 dated Mar. 23, 2018.

EP Examination Report for Application No. 13 157 092.1-1610 dated Sep. 22, 2017.

EP Search Report, EP10187079.8-2321 dated Feb. 4, 2011.

Kusterer et al., Double-Jet Film-Cooling for Highly Efficient Film-Cooling with Low Blowing Ratios, Proceedings of ASME Turbo Expo 2008: Power for Land, Sea and Air GT2008, Jun. 9-13, 2008, pp. 1-12, Berlin, Germany, GT2008-50073.

Wayne et al., High-Resolution Film Cooling Effectiveness Comparison of Axial and Compound Angle Holes on the Suction Side of a Turbine Vane, Transactions of the ASME, pp. 202-211, Copyright 2007 by ASME.

Lu et al., Turbine Blade Showerhead Film Cooling: Influence of Hole Angle and Shaping, International Journal of Heat and Fluid Flow 28 (2007) pp. 922-931.

Kim et al., Influence of Shaped Injection Holes on Turbine Blade Leading Edge Film Cooling, International Journal of Heat and Mass Transfer 47 (2004) pp. 245-256.

USPTO Notice of Allowance for U.S. Appl. No. 13/644,824 dated Jun. 18, 2018.

USPTO Office Action for U.S. Appl. No. 13/644,824 dated Jun. 15, 2017.

EP Examination for Application No. 10187079.8-1610 dated Nov. 24, 2016.

USPTO Notice of Allowance for U.S. Appl. No. 13/465,647 dated Jan. 13, 2017.

USPTO Office Action for U.S. Appl. No. 13/477,883 dated Feb. 9, 2017.

USPTO Office Action for U.S. Appl. No. 13/477,883 dated Aug. 25, 2017.

USPTO Office Action for U.S. Appl. No. 13/644,824 dated Jan. 30, 2018.

USPTO Office Action for U.S. Appl. No. 13/465,647 dated Aug. 11, 2016.

* cited by examiner

ENGINE COMPONENTS WITH COOLING HOLES HAVING TAILORED METERING AND DIFFUSER PORTIONS

TECHNICAL FIELD

The present invention generally relates to gas turbine engines, and more particularly relates to air cooled components of gas turbine engines, such as turbine and combustor components.

BACKGROUND

Gas turbine engines are used in a wide range of applications, such as aircraft engines and auxiliary power units. In a gas turbine engine, air is compressed in a compressor and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. The hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path, in order to prevent overheating and potential mechanical issues attributable thereto. As such, it is desirable to cool the rotor blades and stator vanes in order to prevent damage and extend useful life. One mechanism for cooling turbine airfoils is to duct cooling air through internal passages and then vent the cooling air through holes formed in the airfoil. The holes are typically formed in selected locations to provide a film of cooling air over portions of the airfoil. In some instances, the cooling of engine components in an efficient and effective manner remains a challenge.

Accordingly, it is desirable to provide a gas turbine engine with components having improved film cooling. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine component includes a body having an internal surface and an external surface, the internal surface at least partially defining an internal cooling circuit. The component further includes a plurality of cooling holes formed in the body and extending between the internal cooling circuit and the external surface of the body. The plurality of cooling holes includes a first cooling hole with a metering portion with a constant cross-sectional area and a cross-sectional shape having a maximum height that is offset relative to a longitudinal centerline of the metering portion; and a diffuser portion extending from the metering portion to the external surface of the body.

In accordance with another exemplary embodiment, a turbine section of a gas turbine engine includes a housing defining a hot gas flow path; a plurality of circumferential rows of airfoils disposed in the hot gas flow path, each airfoil defining an inner surface and an outer surface; and a plurality of cooling holes arranged within at least one of the plurality of circumferential rows of airfoils. A first cooling hole of the plurality of cooling holes is defined by a metering portion with a constant cross-sectional area and a cross-sectional shape having a maximum height that is offset relative to a longitudinal centerline of the metering portion; and a diffuser portion extending from the metering portion to the external surface of the body.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with components having improved film cooling. The turbine components have a number of cooling holes that have tailored metering portions of fixed or constant cross-sectional shape and area that transition into diffuser portions at the outlets. This arrangement may provide improved effectiveness of the resulting film on the surface of the component.

Figure 1:
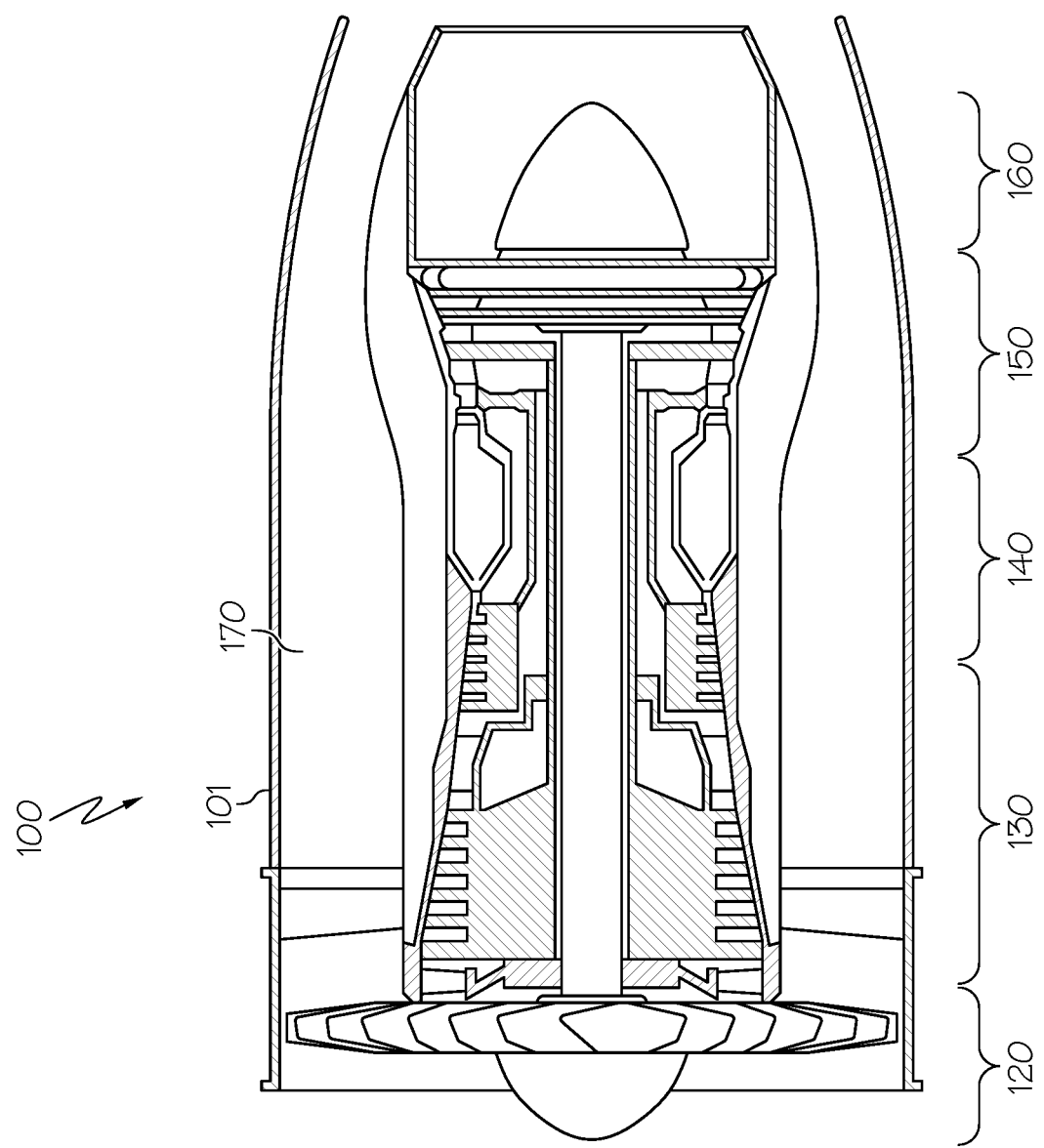
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
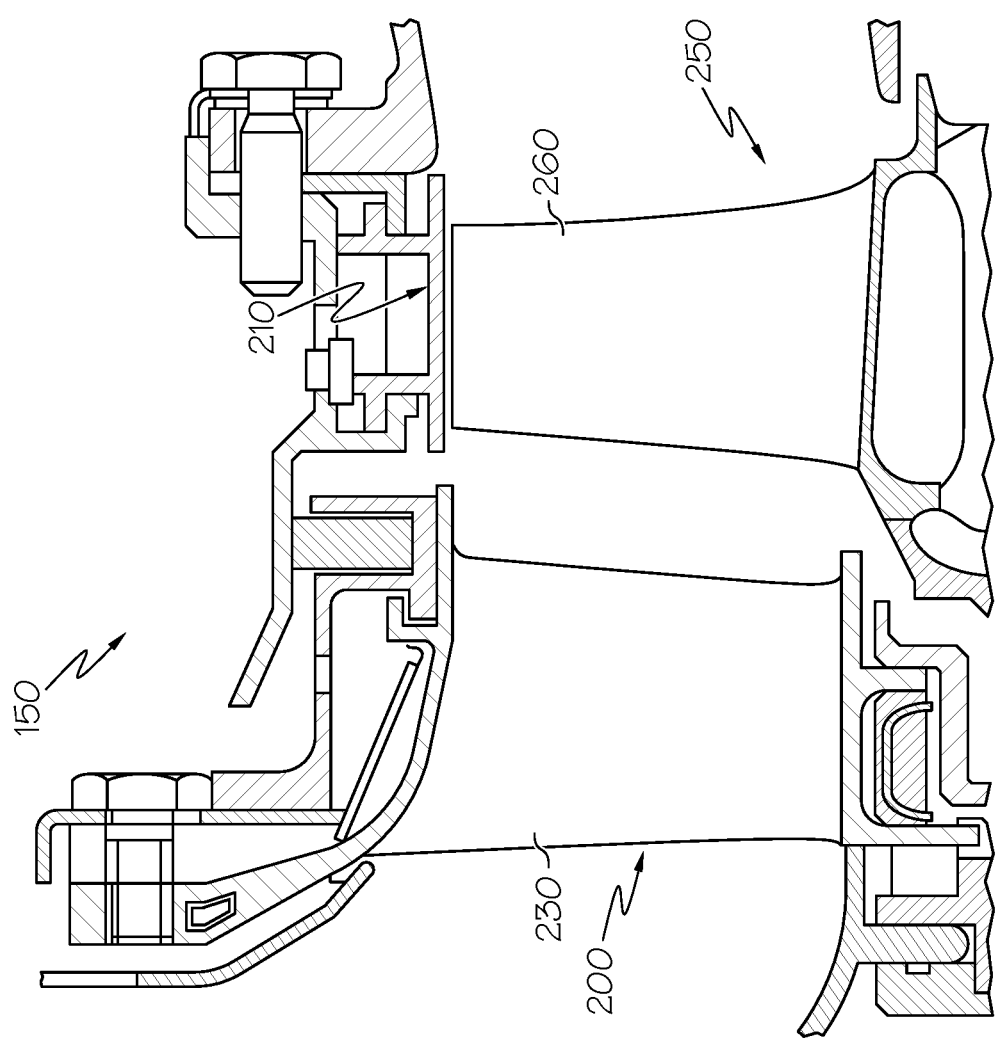
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1, in accordance with an exemplary embodiment. The turbine section 150 includes a turbine stator assembly 200 and a turbine rotor assembly 250 surrounded by a shroud 210 defining a gas flow path through which hot, combusted air from an upstream combustor section (e.g. combustion section 140 of FIG. 1) is directed. Although only one turbine stator assembly 200 and one turbine rotor assembly 250 are shown, such stator assemblies 200 and rotor assemblies 250 are typically arranged in alternating axially spaced, circumferential rows. As used herein, the term "axial" refers to a direction generally parallel to the engine centerline, while the term "radial" refers to a direction generally perpendicular to the engine centerline.

The rotor assembly 250 generally includes rotor blades (or airfoils) 260 (one of which is shown) mounted on a rotor disc (not shown), which in turn is coupled to an engine shaft (not shown). The turbine stator assembly 200 includes stator vanes (or airfoils) 230 (one of which is shown) that direct the air toward the rotor assembly 250. The air impinges upon rotor blades 260 of the rotor assembly 250, thereby driving the rotor assembly 250 for power extraction. To allow the turbine section 150 to operate at desirable elevated temperatures, certain components are cooled. For example, a supply of cooling air, typically obtained as a bleed flow from the compressor (not shown), may pass through internal cooling circuits, and then may pass through cooling holes in the stator assemblies 200 and rotor assemblies 250 to form surface cooling film. Although the cooling mechanisms are discussed with reference to turbine components, the cooling mechanisms may also be incorporated into other engine components, such as combustor or compressor components. The cooling mechanisms are discussed in greater detail below.

Figure 3:
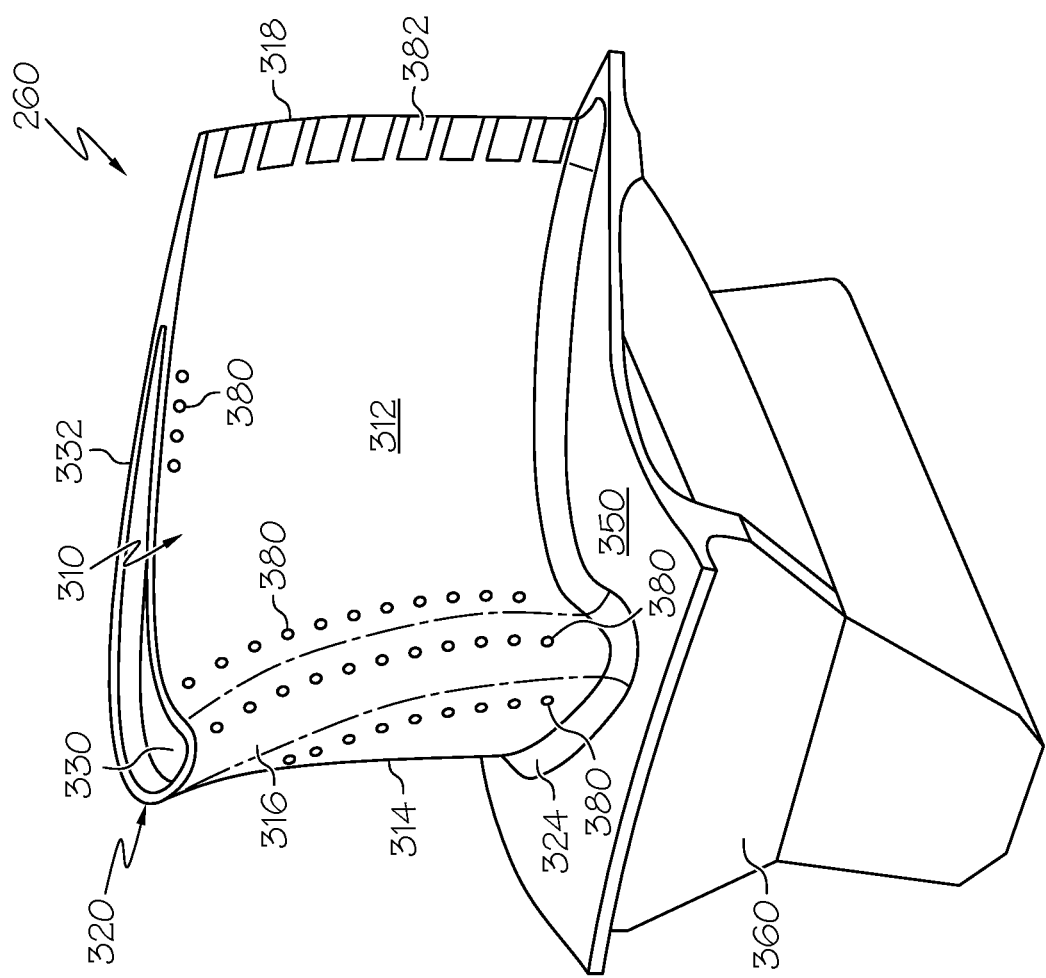
FIG. 3 is an isometric view of a turbine rotor blade of the turbine section of FIG. 2 in accordance with an exemplary embodiment.

FIG. 3 illustrates an exemplary turbine rotor blade, such as rotor blade 260 of FIG. 2, removed from a turbine section. FIG. 3 depicts one exemplary embodiment, and other exemplary embodiments may have alternate configurations or arrangements. Aspects of the rotor blade 260 may also be applicable to the rotor vane 230 (FIG. 2), particularly the cooling mechanisms.

The rotor blade 260 includes an airfoil 310, a platform 350 and a root 360. The platform 350 is configured to radially contain turbine air flow within a shroud (e.g., shroud 210 of FIG. 2). The root 360 extends from the underside of the platform 350 and is configured to couple the rotor blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials such as SC180 or CMSX4, steels, titanium alloys or the like. In various embodiments, the rotor blade 260 may be manufactured by casting, molding, and/or additive manufacturing techniques.

The airfoil 310 projects radially outward from the platform 350. The airfoil 310 has two side (or outer) walls 312, 314 each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. The trailing edge 318 includes trailing edge slots 382, discussed below. In an axial direction, the airfoil side walls 312, 314 extend from a base 324 at the platform 350 to a blade tip 320 formed by a tip cap 330 and squealer tip extensions 332. In general, the blade tip 320 is positioned to rotate in close proximity to the shroud 210 (FIG. 2) in order to maximize energy extraction.

As noted above, the rotor blade 260, particularly the airfoil 310, is subject to extremely high temperatures resulting from high velocity hot gases ducted from the combustion section 140 (FIG. 1). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from inlets in the root 360 through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310. In FIG. 3, the film cooling holes 380 are positioned on the blade tip 320, in the area of the leading edge 316, and in areas immediately aft of the leading edge 316, although film cooling holes 380 may be provided in other locations. The locations of the film cooling holes 380 are schematically shown, but the particular shapes and configurations of exemplary film cooling holes will be discussed in greater detail below.

Figure 4:
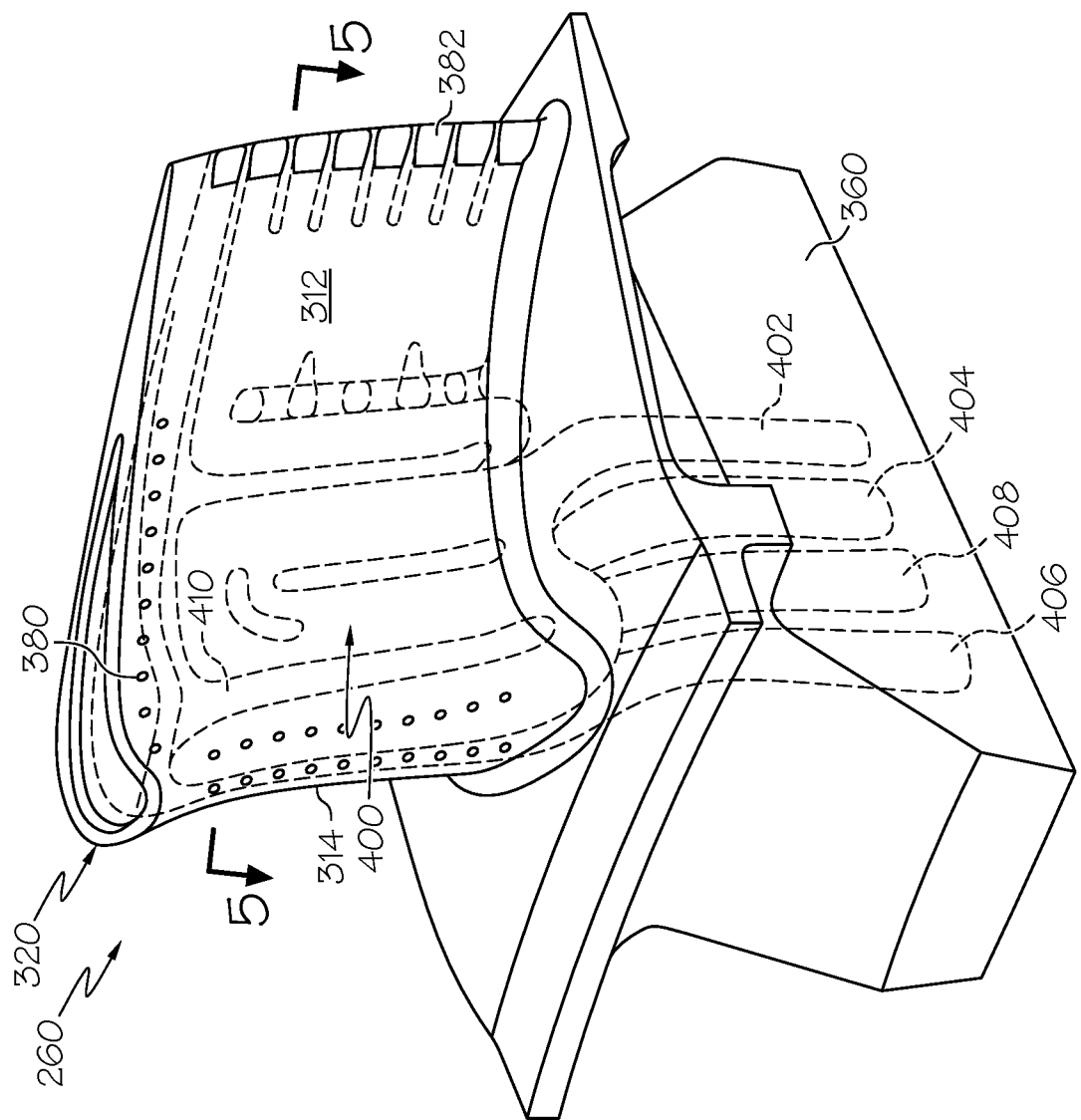
FIG. 4 is an isometric view of the turbine rotor blade of FIG. 3 schematically showing an internal cooling circuit in accordance with an exemplary embodiment.
Figure 5:
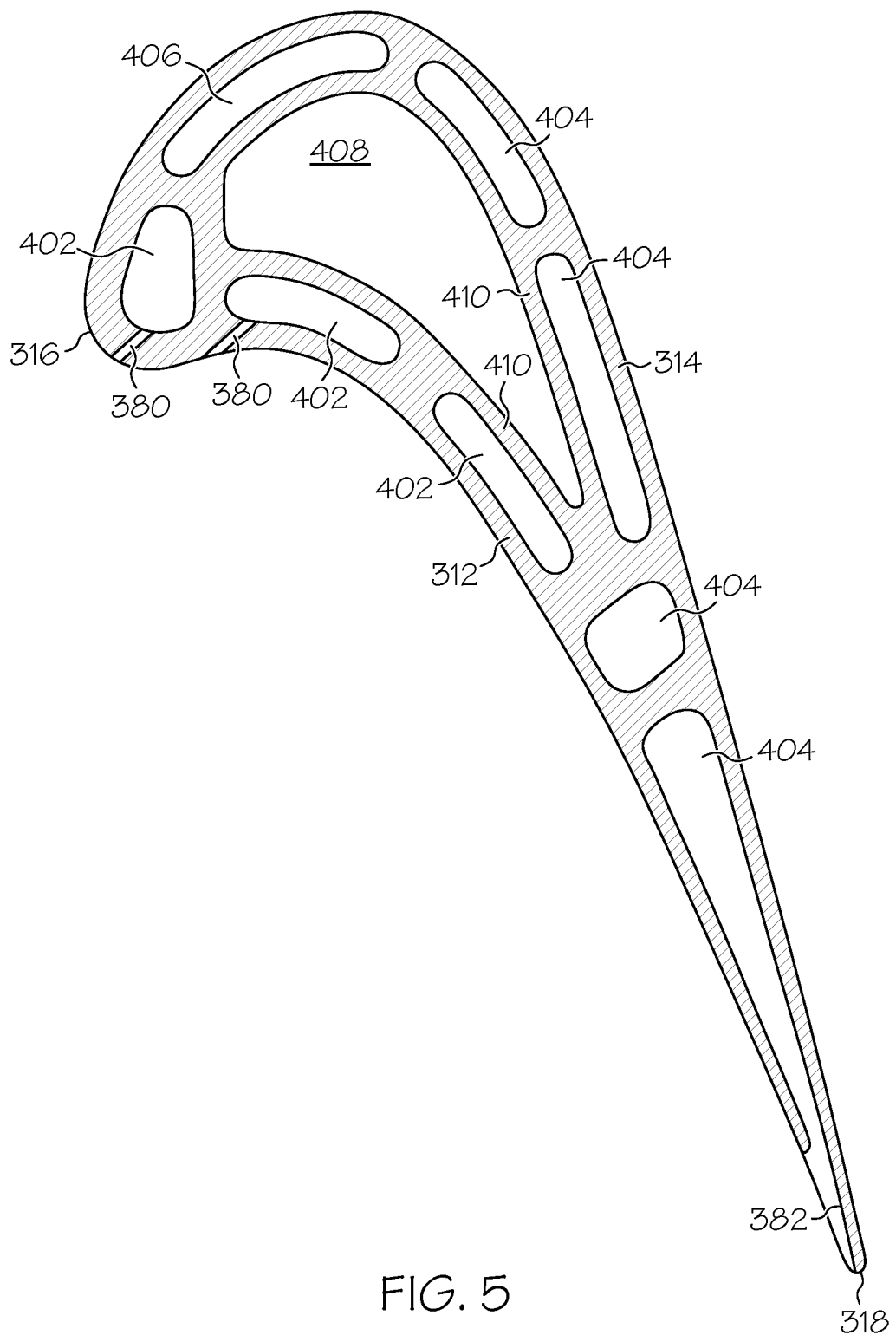
FIG. 5 is a cross-sectional view of an airfoil of the turbine rotor blade taken along lines 5-5 of FIG. 4 in accordance with an exemplary embodiment.

FIG. 4 is an isometric view of the rotor blade 260 and particularly shows an outline of an internal cooling circuit 400 formed therein. The internal cooling circuit 400 is configured to cool the first side wall 312, second side wall 314, and blade tip 320 by directing air from an inlet formed in the root 360 to the trailing edge slots 382 and/or cooling holes 380. The internal cooling circuit 400 is made up of a plurality of flow circuit portions (as shown in FIG. 5), including a pressure side flow circuit portion 402, a suction side flow circuit portion 404, a tip flow circuit portion 406, and a center flow circuit portion 408. The pressure side flow circuit portion 402 directs air from the root 360 along the first side wall 312. The suction side flow circuit portion 404 receives air from the root 360 and directs the air along the suction side wall 314. The tip flow circuit portion 406 receives air from the suction side flow circuit portion 404 and the center flow circuit portion 408 and directs the air along the blade tip 320. The center flow circuit portion 408 takes air from the root 360 and cools internal walls, e.g., walls 410, that also partially define the other flow circuit portions 402, 404, 406. The internal cooling circuit 400 is merely one exemplary configuration and generally corresponds to a high effectiveness cooled turbine blade or vane. Other types and configurations of cooling circuits may be provided, including more integrated or isolated cooling circuits, to optimize flow and heat transfer characteristics of the flow circuit 400. Various pins, cross-over holes, turning vanes, turbulators, depressions, and accelerators may be provided in the internal cooling circuit 400 as necessary or desired.

Accordingly, the internal cooling circuit 400 forms a number of internal passages and segments through the interior of the rotor blade 260. As an example, FIG. 5 is a cross-sectional view of the rotor blade 260 through line 5-5 of FIG. 4. FIG. 5 particularly shows portions of the side walls 312, 314; leading edge 316; trailing edge 318; trailing edge slot 382; pressure side flow circuit portion 402; suction side flow circuit portion 404; tip flow circuit portion 406; center flow circuit portion 408; and internal walls 410. As noted above, the cooling air flows through the circuit portions 402, 404, 406, 408 and exits through trailing edge slots 382. Additionally, the air may exit through the film cooling holes 380, examples of which are described in greater detail below.

Figure 6:
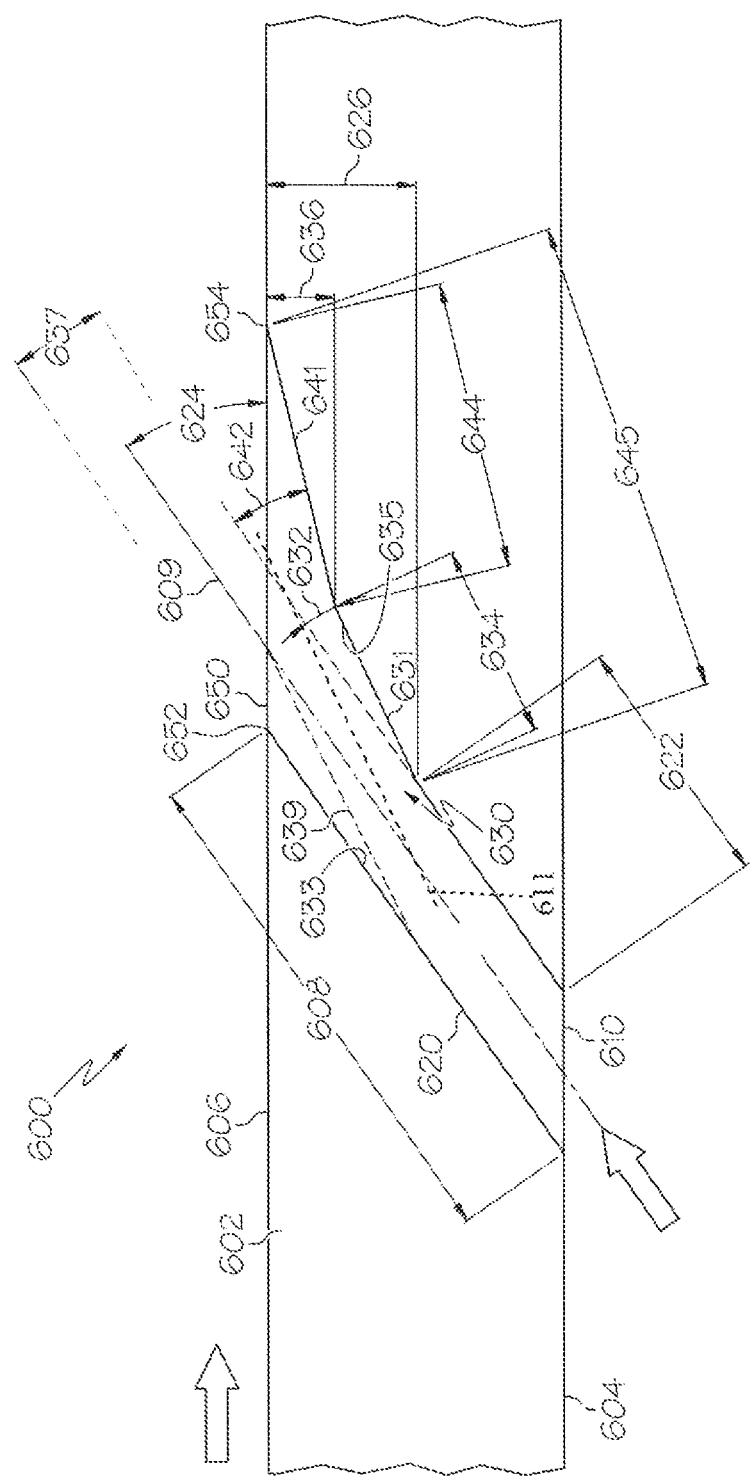
FIG. 6 is a cross-sectional view of a cooling hole in accordance with an exemplary embodiment.

FIG. 6 is a cross-sectional view of a cooling hole 600, which may correspond to the cooling holes 380 discussed above, although cooling hole 600 may represent a cooling hole in any engine component. The cooling hole 600 extends through a wall 602 (e.g., wall 312 or 314 of FIG. 5) between an inner surface 604 and an outer surface 606 at a longitudinal length 608. The inner surface 604 forms a portion of a cooling circuit (e.g., circuit 400 of FIG. 4) to receive cooling flow, and the outer surface 606 is exposed to the mainstream hot gas flow.

Generally, the cooing hole 600 includes an inlet 610, a fixed or constant cross-sectional metering portion 620, a diffuser portion 630, and an outlet 650. The inlet 610 may be any suitable shape, such as oval, and defined in the inner surface 604. In one exemplary embodiment, the inlet 610 may have a shape that corresponds to the shape of the metering portion 620, such as the shapes discussed below.

The metering portion 620 extends from the inlet 610 to the diffuser portion 630 and generally may have a size, shape, and length to meter the appropriate amount of cooling air through the hole 600. In one exemplary embodiment, the metering portion 620 has cross-sectional shape with a fixed or constant area in a plane perpendicular to and along the longitudinal axis 609 of the hole 600. In particular, the cross-sectional shape may be tailored to include a particular lateral air flow distribution within the metering portion 620. Examples and details regarding such shapes are described below.

The metering portion 620 may be inclined relative to the outer surface 606 at any suitable angle 624 and extend to any suitable depth, e.g., from the inner surface 604 to a depth 626 from the outer surface 606. In one exemplary embodiment, the metering portion 620 may be inclined relative to the outer surface 606 at an angle of 20°-45°, as examples.

The diffuser portion 630 extends from the metering portion 620. In one exemplary embodiment, the diffuser portion 630 may have one or more sections 631, 641. FIG. 6 depicts two sections 631, 641, but other embodiments may only have a single section of consistent size and/or shape, or have additional sections. Although the sections 631, 641 are described in greater detail below, diffuser portion 630 generally provides lateral and forward diffusion relative to the metering portion 620. The diffuser portion 630 may be considered to have a ceiling or top surface 633 and a bottom surface 635 that are joined at sides (not shown in FIG. 6). In one exemplary embodiment, the top surface 633 may be coincident or otherwise at the same angle relative to axis 609 as a corresponding top surface of the metering portion 620. In another embodiment, the top surface 633 may be inclined at a forward angle 637 relative to the metering portion 620, as schematically depicted by dashed line 639 and may extend along an axis 611 that is oblique to the axis 609.

The metering portion 620 and diffuser portion 630 may have any suitable lengths 622, 645. Typically, the intersection between the portions 620, 630 is approximately halfway along the length 608 of the hole 600. Generally, the intersection may be within the middle half of the hole 600. In one example, the metering portion 620 is at least 25% or at least 50% of the overall length 608 of the hole 600. Moreover, the diffuser portion 630 typically starts at a depth such that at least a section of the diffuser portion 630 is "covered" by the top surface 633. In other words, the diffuser portion 630 is part of the hole 600 itself, not merely a surface feature or trench on the surface 606. The length of the metering portion 620 and the fixed cross-sectional area along the length of the metering portion 620 provide a predictable and consistent amount of cooling flow through the hole 600 prior to the air reaching the diffuser portion 630.

The first diffuser section 631 may have any suitable shape, including the shapes described in greater detail below. The first diffuser section 631 extends at an angle 632 relative to the metering portion 620 at a length 634, e.g. from the depth 626 of the metering portion 620 to depth 636 relative to the outer surface 606. The second diffuser section 641 extends from the first diffuser section 630. The second diffuser section 641 may have any suitable shape, including the shapes described in greater detail below. The second diffuser section 641 extends at an angle 642 relative to the metering portion 620 at a length 644, e.g., from the depth 636 to the outer surface 606. As shown in FIG. 6, the angle 642 of the second diffuser section 641 is greater that the angle 632 of the first diffuser section 631 such that the hole 600 may be considered to have a forward sweep configuration. Although the hole 600 has two, generally increasing angled portions (e.g., angles 632 and 642), other exemplary embodiments may have additional exit portions with further increasing angles. In one exemplary embodiment, the angle 632 of the first diffuser section 631 is about 20° and the angle 642 of the second diffuser section 641 is about 40°. In another exemplary embodiment, the angle 632 of the first diffuser section 631 is about 10° and the angle 642 of the second diffuser section 641 is about 20°. In a further embodiment, the angle 642 of the second diffuser section 641 may be at least twice as much as the angle 632 of the first diffuser section 631.

As noted above, the first and second diffuser sections 631, 641 may be inclined at the same angle (e.g., such that angles 632, 642 are equal) to, in effect, result in a single diffuser section with a length 645. Additional details about the shape of the diffuser portion 630 (e.g., either of sections 631, 641) are provided below.

The outlet 650 may have any suitable shape, including the shapes described in greater detail below. The outlet 650 may be considered to have a leading edge 652 and a trailing edge 654, which generally refer to the orientation of the hole 600 relative to mainstream gas flow. Typically, the outlet 650 has a shape that corresponds to the shape of the diffuser portion 630.

As additionally shown in FIG. 6, the first and second diffuser section 631, 641 are generally straight portions. In other exemplary embodiments, the first and second diffuser section 631, 641 may be other shapes, including curved. For example, each (or both) of the first and second diffuser sections 631, 641 may be a continuously curved portion with a constant or varied radius of curvature, such as a decreasing radius of curvature. For example, the first diffuser section 631 may have a first radius of curvature and the second diffuser section 641 may have a second radius of curvature that is less than the first radius of curvature. In other embodiments, the first diffuser section 631 may have a first radius of curvature and the second diffuser section 641 may have a second radius of curvature that is greater than the first radius of curvature to enable compatibility with internal cooling features, as described below.

Figure 7:
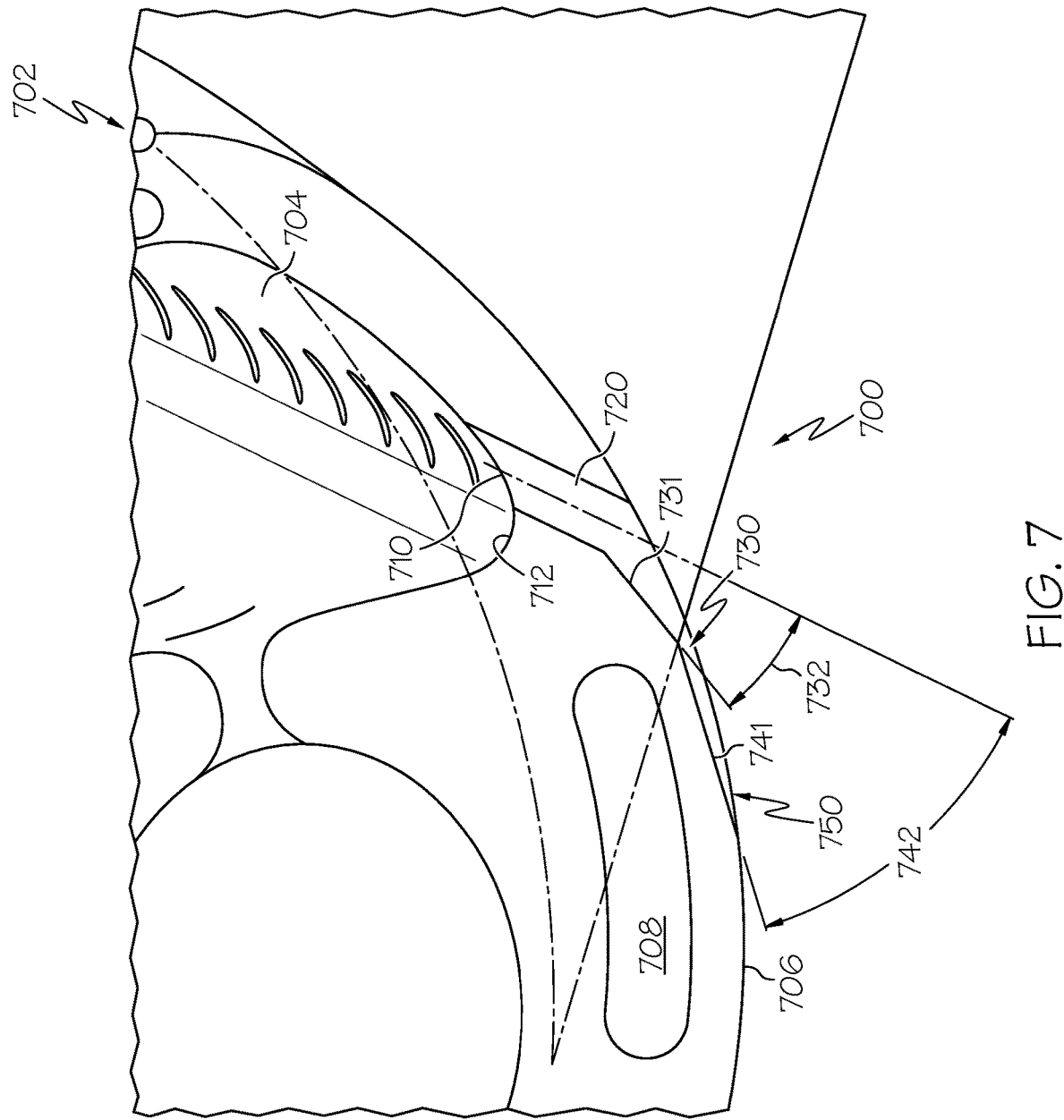
FIG. 7 is a cross-sectional view of a portion of an airfoil in accordance with an exemplary embodiment.

In some embodiments, increasing the angle of the second diffuser section 641 relative to the first diffuser section 631 enables the placement of cooling flow in areas that may have been previously unavailable for cooling. For example, FIG. 7 is a cross-sectional view of a cooling hole 700, similar to the cooling hole 600 of FIG. 6, incorporated into an airfoil 702. As above, the cooing hole 700 includes an inlet 710; a relatively straight metering portion 720; a diffuser portion 730 with a first section 731 and a second section 741; and an outlet 750. The inlet 710 may be any suitable shape, such as oval, and receives cooling air flow from cavity (or circuit portion) 704. The metering portion 720 extends from the inlet 710 and may function to meter the appropriate amount of cooling air through the hole 700. The first diffuser section 731 extends from the metering portion 720 at a first angle 732, and the second diffuser section 741 extends from the first diffuser section 731 at a second angle 742 relative to the metering portion 720. As a result of the angles 732, 742, the cooling hole 700 is configured to provide cooling air to a location (e.g., location 706) that is a relatively large distance from the cavity 704, which may be an area that may otherwise be difficult to cool. For example, because of metering, air flow considerations, or source issues, it may be otherwise difficult to provide cooling air from a closer cavity (e.g., cavity 708) to location 706. Similarly, without angles 732, 742, it would be difficult to provide cooling air from cavity 704 to location 706, e.g., cavity 708 may otherwise impede or prevent a direct cooling hole or a simple compound cooling hole from delivering cooling air flow directly to location 706. In addition, utilization of the multi-forward angle swept cooling hole 700 allows the inlet 710 to be moved away from the high stressed fillet 712.

The cooling holes discussed above may have various shapes and/or configurations with respect to metering portions and diffuser portions. FIGS. 8-16, described below, provide details about particularly advantageous embodiments. The elements or features of the cooling holes of FIGS. 8-16 may be combined with one another and/or with additional cooling hole characteristics, as necessary or desired.

Figure 8:
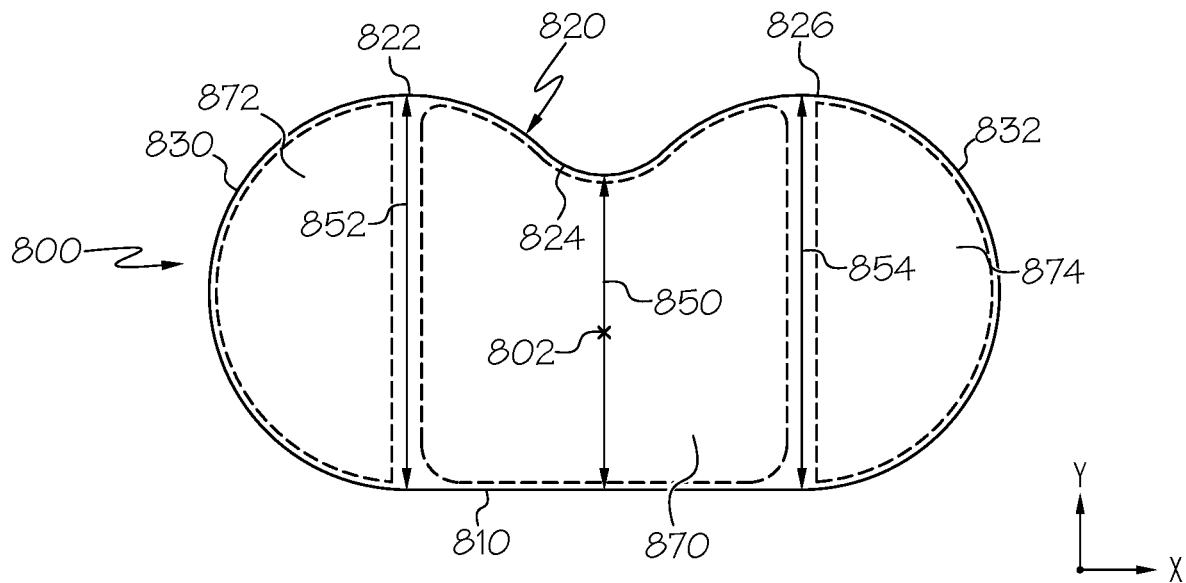
FIG. 8 is a cross-sectional view of a metering portion of a cooling hole in accordance with an exemplary embodiment.
Figure 9:
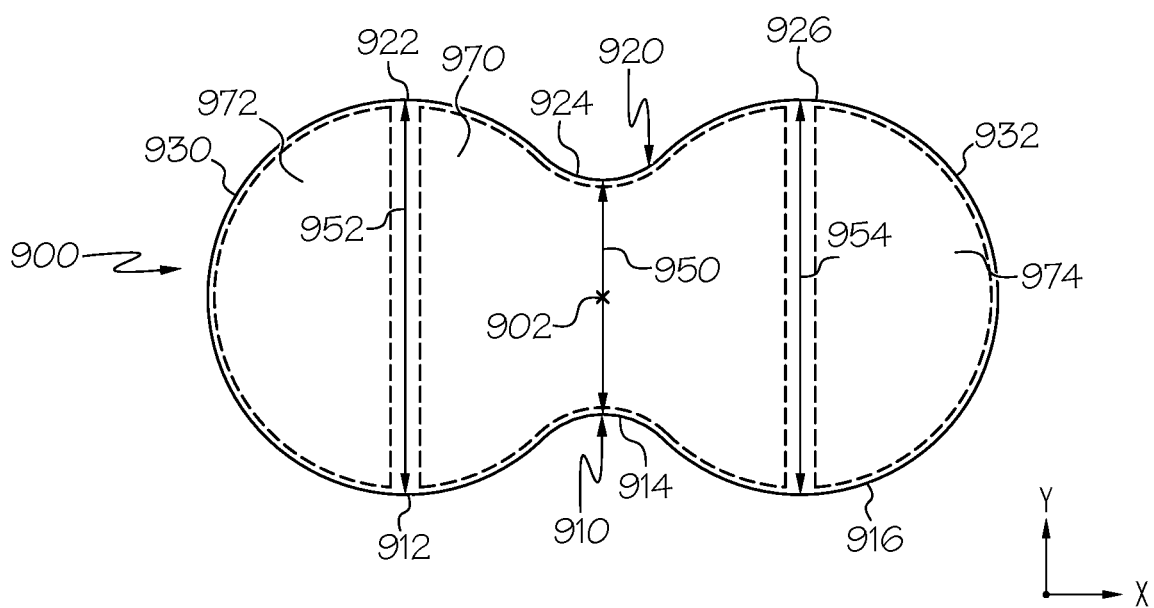
FIG. 9 is a cross-sectional view of a metering portion of a cooling hole in accordance with another exemplary embodiment.

FIGS. 8 and 9 are exemplary cross-sectional sectional views of metering portions 800, 900 that may be incorporated into the cooling holes described herein. As described below, the metering portions 800, 900 may have tailored cross-sectional shapes that enhance the function of the downstream diffuser portions. In particular, each of the metering portions 800, 900 has a cross-sectional shape that functions to channel a bulk of the momentum of the cooling air to the lateral edges, as described below. The shapes of the metering portions 800, 900 will be initially described prior to a more detailed discussion of the resulting function.

Referring initially to FIG. 8, the metering portion 800 in this example may be considered "bean-shaped" with a relatively flat bottom surface 810, a curved top surface 820, and curved sides 830, 832. In particular, the top surface 820 has a convex section 822, a concave section 824, and a convex section 826. In one exemplary embodiment, the convex section 822 transitions directly into the concave section 824, which transitions directly into the convex section 826. The convex sections 822, 826 respectively transition into the convex sides 830, 832. In this embodiment, the metering portion 800 is generally symmetrical about a central axis in the y-direction and asymmetrical about a central axis in the x-direction. A reference point 802 generally depicts the position of centerline or longitudinal axis of the metering portion 800.

As a result of the nature of the top surface 820, particularly in relation to the bottom surface 810, the cross-sectional area distribution of the metering portion 800 is increased on the edges relative to the center. Stated differently, the metering portion 800 has a height 850 at the center (e.g., intersecting the centerline 802 in the y-direction) that is not the maximum height. For example, the height 850 is less than a diameter (or height) 852 and/or a diameter (or height) 854 that are offset relative to center and closer to the sides 830, 832. Diameters 852, 854 may be considered edge (or offset) diameters. The relationship between height 850 and diameters 852, 854 is a result of the concave section 824 of the top surface 820 relative to the flat bottom surface 810. In this embodiment, the diameters 852, 854 are the maximum diameters (or heights) in the metering portion 800, e.g. at the convex section 822, 826 transitioning to the convex sides 830, 832.

As a result of this arrangement, the metering portion 800 may be considered to have a center flow zone 870 and outer flow zones 872, 874. For example, as delineated by dashed lines in FIG. 8, the center flow zone 870 may extend between the two diameters 852, 854, and the outer flow zones 872, 874 may be considered to extend between the respective diameter 852, 854 and side 830, 832. Additional details about these zones 870, 872, 874 will be provided below.

Subject to the cross-sectional area distribution characteristics described above, the dimensions of the metering portion 800 may vary. One example of an exemplary construction is provided below. To form the metering portion 800, initially, two identical geometric or contoured shapes represented by construction circles or other shapes (e.g., ellipsis or spline) are formed and joined at a tangent that generally corresponds to the centerline 802 of the metering portion 800. In one exemplary embodiment, such construction circles may have diameters that correspond to the maximum diameters 852, 854 of the metering portion 800. On a top side, a further construction circle or shape may be formed and joined at tangents to construction circles to, in combination, form the top surface 820, while a line tangent to initial construction circles forms the bottom surface 810. In one example, a ratio of the height 850 at the center of the shape relative to the maximum diameters 852, 854 may be approximately 0.85 to 1, as an example. In other examples, this ratio may be less than 0.9 to 1, less than 0.8 to 1, or less than 0.7 to 1, or other dimensions. It should be noted that other techniques may be used to form the metering portion 800. For example, the construction circles may be spaced apart from one another at a distance. In further embodiments, the shapes may be formed according to a Pedal curve or Ceva's trisectrix equation.

Referring to FIG. 9, the metering portion 900 in this example may be considered "peanut-shaped" or "dog-bone-shaped" with a curved bottom surface 910, a curved top surface 920, and curved sides 930, 932. In particular, the top surface 920 has a convex section 922, a concave section 924, and a convex section 926. In one exemplary embodiment, the convex section 922 transitions directly into the concave section 924, which transitions directly into the convex section 926. Similarly, the bottom surface 910 has a convex section 912, a concave section 914, and a convex section 916. The convex sections 922, 926; 912, 916 respectively transition into the convex sides 930, 932. In this embodiment, the metering portion 900 is generally symmetrical about a central axis in the x-direction and symmetrical about a central axis in the y-direction. A reference point 902 generally depicts the position of centerline or longitudinal axis of the metering portion 900.

As a result of the relationship of the bottom surface 910 relative to the top surface 920, the cross-sectional area distribution of the metering portion 900 is increased on the edges relative to the center. Stated differently, the metering portion 900 has a height 950 at the center (e.g., intersecting the centerline in the y-direction) that is not the maximum height. For example, the height 950 is less than diameter (or height) 952 and/or diameter (or height) 954 that are offset relative to center and closer to the sides 930, 932, e.g. at the convex sections 912, 922; 916, 926 transitioning to the convex sides 930, 932. Diameters 952, 954 may be considered edge diameters.

As a result of this arrangement, the metering portion 900 may be considered to have a center flow zone 970 and outer flow zones 972, 974. For example, as depicted by dashed lines, the center flow zone 970 may extend between the two diameters 952, 954, and the outer flow zones 972, 974 may be considered to extend between the respective diameter 952, 954 and side 930, 932. Additional details about these zones 970, 972, 974 will be provided below.

Subject to the cross-sectional area distribution characteristics described above, the dimensions of the metering portion 900 may vary. One example of an exemplary construction is provided below. To form the metering portion 900, initially, two identical construction circles or other shapes (e.g. ellipsis or spline) are formed and joined at a tangent that generally corresponds to the centerline 902 of the metering portion 900. In one exemplary embodiment, the construction circles have diameters that correspond to the maximum diameters 952, 954 of the metering portion 900. Further construction circles (or other shapes) are formed and joined at tangents to the initial construction circles to form the bottom surface 910 and top surface 920. In one example, this results in a ratio of the height 950 at the center of the shape relative to the maximum diameters 952, 954 being approximately 0.85 to 1, as an example. It should be noted that other techniques may be used to form the metering portion 900, including other ratios and shapes, such as those formed according to a Pedal curve or Ceva's trisectrix equation.

Prior to a more detailed description of exemplary diffuser portions, a brief description of the air flow characteristics within the metering portions, such as metering portions 800, 900, is provided below. In fluid mechanics, one of the key parameters used to evaluate flow characteristics through internal ducts (or holes) is the hydraulic diameter ($D_h$), which can be viewed as a measure of the duct's ability to pass cooling flow. For example, large diameter ducts have a large flow area and pass more air relative to smaller diameter ducts for the same inlet and outlet boundary conditions. For non-circular ducts, the calculation may be more difficult to quantify due to the influence of viscous shear losses along the duct internal walls, which resist flow. Thus, those skilled in the art may utilize a more generalized flow parameter such as hydraulic diameter that accounts for both cross-section flow area (A) and a wetted perimeter (P). For example, the cross-sectional flow area of a rectangular duct of height (H) and width (W) is equal to the duct width (W) times the duct height (H). Similarly, the wetted perimeter (P) for this rectangular duct is the sum of sides (e.g., P=W+W+H+H). As a result, the hydraulic diameter of a rectangular duct may be expressed by the following Equation (1):

$$D_h = \frac{2HW}{H+W} \qquad \text{Equation (1)}$$

Similarly, the hydraulic diameter of a round duct with a diameter (D) may be expressed by the following Equation (2):

$$D_h = \frac{4\left(\frac{\pi D^2}{4}\right)}{\pi D} = D \qquad \text{Equation (2)}$$

Conventional cooling holes are typically round or rectangular with rounded edges (e.g., a "racetrack" configuration). Cooling flow within these holes is concentrated in the center portion, along the longitudinal axis. As an example, upon consideration of a conventional racetrack configuration with equal central height and edge diameters, the effective hydraulic diameter of a center flow zone is larger than the effective hydraulic diameter of the outer flow zones. As a result, the fluid migrates towards the larger center flow zone to minimize flow resistance. In other words, these conventional shapes hinder lateral migration of the flow.

By comparison, the metering portions 800, 900 described above promote lateral migration of the cooling flow to the outer flow zones 872, 874; 972, 974. Each of the metering portions 800, 900 have a smaller center height 850, 950 relative to the edge diameters 852, 854; 952, 954. Additionally, this would result in smaller center heights 850, 950 and greater edge diameters 852, 854; 952, 954 than a corresponding racetrack configuration (such as described above) for the same cross-sectional area. As a result, the metering portions 800, 900 have greater effective hydraulic diameters in the outer flow zones 872, 874; 972, 974 as compared to conventional holes, thereby improving lateral migration of the cooling flow. As described below, the lateral migration achieved in the metering portions 800, 900 is particularly beneficial in combination with the lateral diffusion provided by the downstream diffuser portions.

Figure 10:
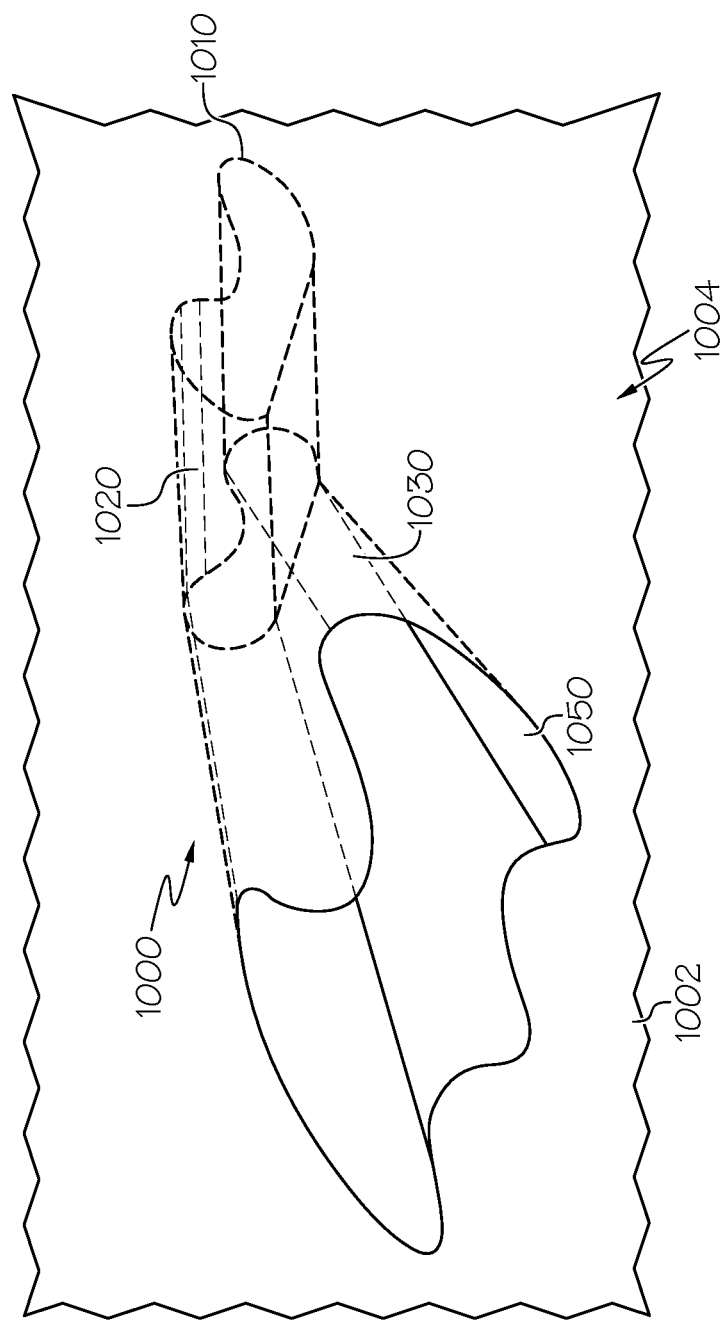
FIG. 10 is an isometric three-dimensional view of a cooling hole in accordance with an exemplary embodiment.

FIG. 10 is an isometric three-dimensional view of a cooling hole 1000 in accordance with an exemplary embodiment that provides a cooling flow of air onto an outer surface 1002 of an airfoil 1004. Unless otherwise noted, the cooling hole 1000 may have a configuration such as the exemplary embodiments discussed above, and may be formed in a rotor assembly, stator assembly, and/or compressor component.

Figure 11:
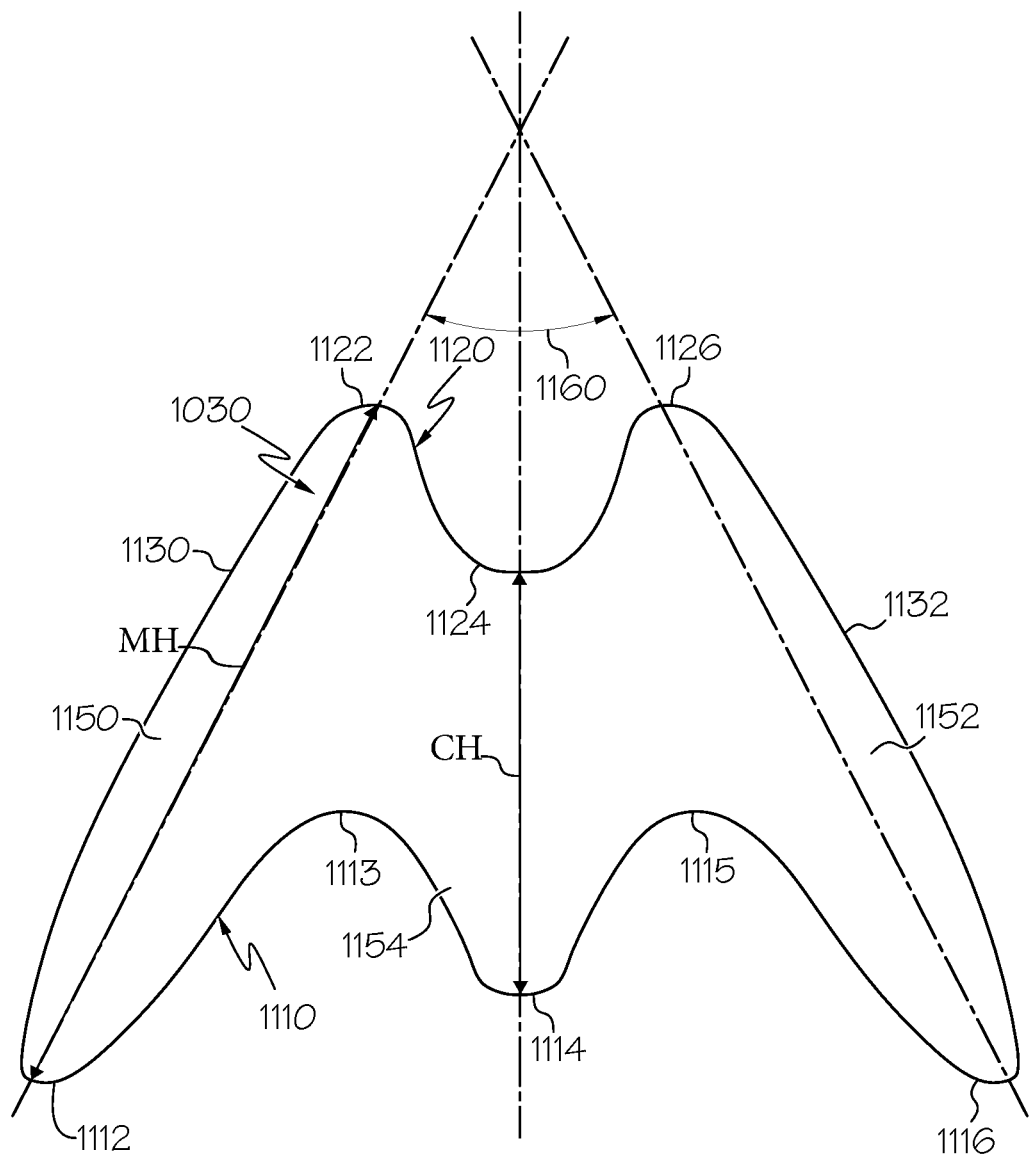
FIG. 11 is cross-sectional view of a diffuser portion of the cooling hole of FIG. 10 in accordance with an exemplary embodiment.

The cooling hole 1000 is considered to have a metering portion 1020 extending from the inlet 1010 and a diffuser portion 1030 extending from the metering portion 1020 to an outlet 1050. The cooling hole 1000 of FIG. 10 is additionally described with reference to FIG. 11. FIG. 11 is a cross-sectional view of the diffuser portion 1030 of the cooling hole 1000 of FIG. 10.

In one exemplary embodiment, the cross-sectional shape of the metering portion 1020 is similar to that of the metering portion 800 of FIG. 8. As such, the metering portion 1020 may have a tailored cross-sectional shape that particularly enhances the function of the downstream diffuser portion 1030. In particular, the metering portion 1020 has a cross-sectional shape that functions to enhance diffusion of the cooling air to the lateral edges, as described above.

As best shown in FIG. 11, the diffuser portion 1030 may be considered to have a "duck-foot" shape with a multi-curve bottom surface (or floor) 1110, a multi-curve top surface (or ceiling) 1120, and curved or flat sides 1130, 1132. The bottom surface 1110 may include a convex section 1112, a concave section 1113, a convex section 1114, a concave section 1115, and a convex section 1116, arranged in sequence between the sides 1130, 1132. As such, the convex sections 1112, 1114, 1116 are formed on the edges and in the middle of the bottom surface 1110 and separated by the concave sections 1113, 1115 to form an "M"-shape. The convex section 1114 is arranged in the center of the bottom surface 1110. Additional details about this shape are provided below.

The top surface 1120 may be formed by a convex section 1122, a concave section 1124, and a convex section 1126. In one exemplary embodiment, these sections 1122, 1124, 1126 are arranged in sequence between the sides 1130, 1132. The concave section 1124 is arranged in the center of the top surface 1120.

In some respects, as a result of the relative shapes of the bottom and top surfaces 1110, 1120, the diffuser portion 1030 may also be considered to be multi-lobed with a first lobe 1150, a second lobe 1152, and a central lobe or area 1154. From top surface 1120 to bottom surface 1110, the first and second lobes 1150, 1152 may be considered splayed relative to one another at an angle 1160. The angle 1160 may be, as an example, approximately 20-24°. The diffuser portion 1030 includes a second maximum height MH defined between the convex section 1122 and the convex section 1112 and a central height CH defined between the concave section 1124 and the convex section 1114, the central height CH less than the second maximum height MH as shown in FIG. 11.

As best shown by FIG. 10, the diffuser portion 1030 expands in cross-sectional area along its length from the metering portion 1020 to the outlet 1050. In one exemplary embodiment, the expansion is constant, although varying rates of expansion may also be provided. As additionally referenced in FIG. 11, the angle of expansion of the top surface 1120 of the diffuser portion 1030 between the metering portion 1020 to the outlet 1050 and the angle of expansion of the bottom surface 1110 of the diffuser portion 1030 between the metering portion 1020 to the outlet 1050 may match angle 1160. As noted above, the angle 1160 may be, as an example, approximately 20-24°, although other angles may be provided.

In one exemplary embodiment, the shape of the top surface 1120 of the diffuser portion 1030 may match the top surface of the metering portion 1020. In other words, the radius of curvature of the convex and concave sections of the top surface of the metering portion 1020 may respectively match the radius of curvature of one or more of the convex section 1122, concave section 1124, and convex section 1126 of the top surface 1120 of the diffuser portion 1030. Additionally, the bottom surface 1110 of the diffuser portion 1030 may transition from the corresponding shape of the metering portion 1020 in any suitable manner, such as an immediate transition at the intersecting position or gradually along a portion of the length of the diffuser portion 1030.

Figure 12:
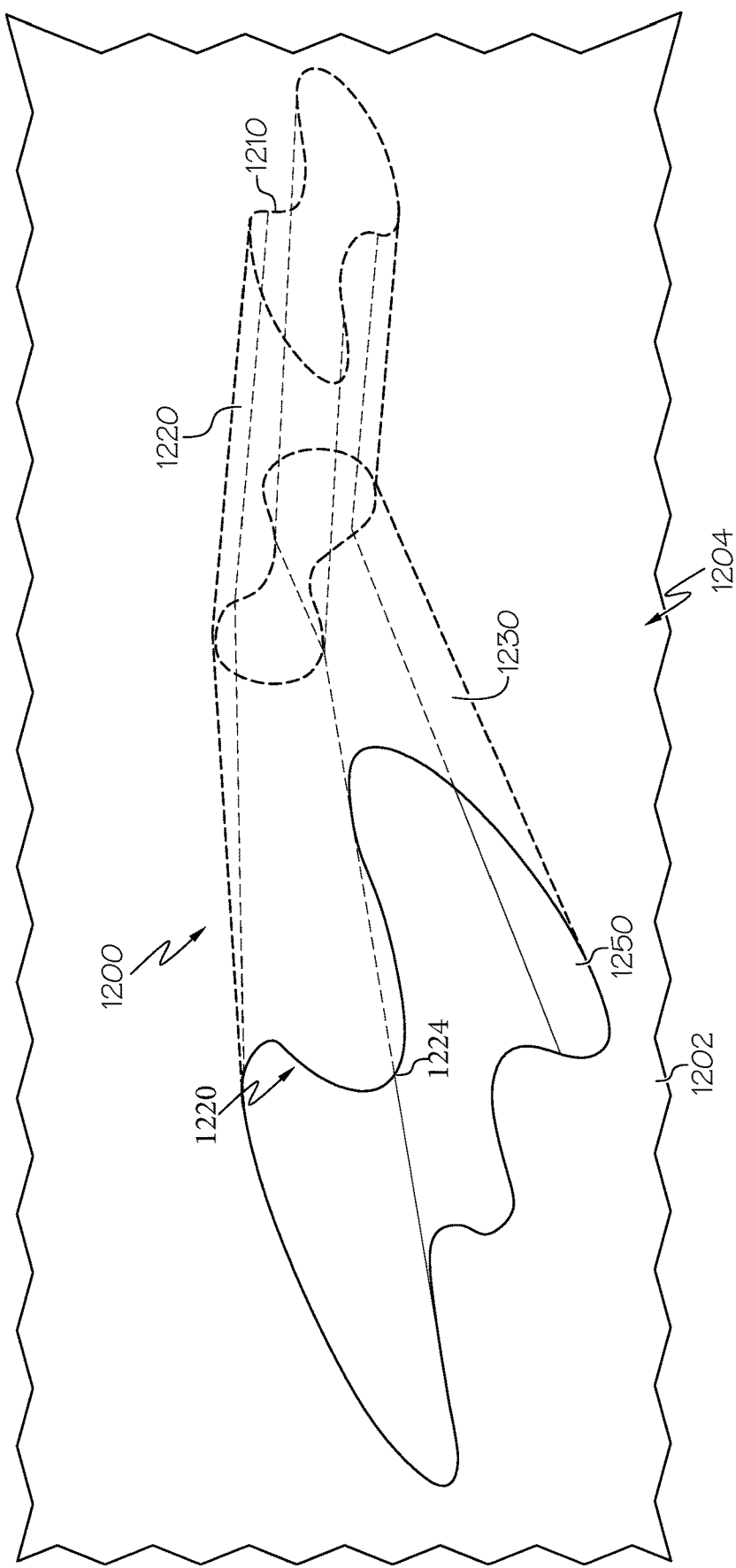
FIG. 12 is an isometric three-dimensional view of a cooling hole in accordance with a further exemplary embodiment.

FIG. 12 is an isometric three-dimensional view of a cooling hole 1200 in accordance with a further exemplary embodiment that provides a cooling flow of air onto an outer surface 1202 of an airfoil 1204. Unless otherwise noted, the cooling hole 1200 may have a configuration such as the exemplary embodiments discussed above, and may be formed in a rotor assembly, stator assembly, and/or compressor component.

The cooling hole 1200 is considered to have a metering portion 1220 extending from the inlet 1210 and a diffuser portion 1230 extending from the metering portion 1220 to an outlet 1250. In one exemplary embodiment, the cross-sectional shape of the metering portion 1220 is similar to that of the metering portion 900 of FIG. 9, and the diffuser portion 1230 of the cooling hole 1200 is similar to the diffuser portion 1030 depicted in FIG. 11. The diffuser portion 1230 includes a central concave section 1224 along a top surface 1220.

Figure 13:
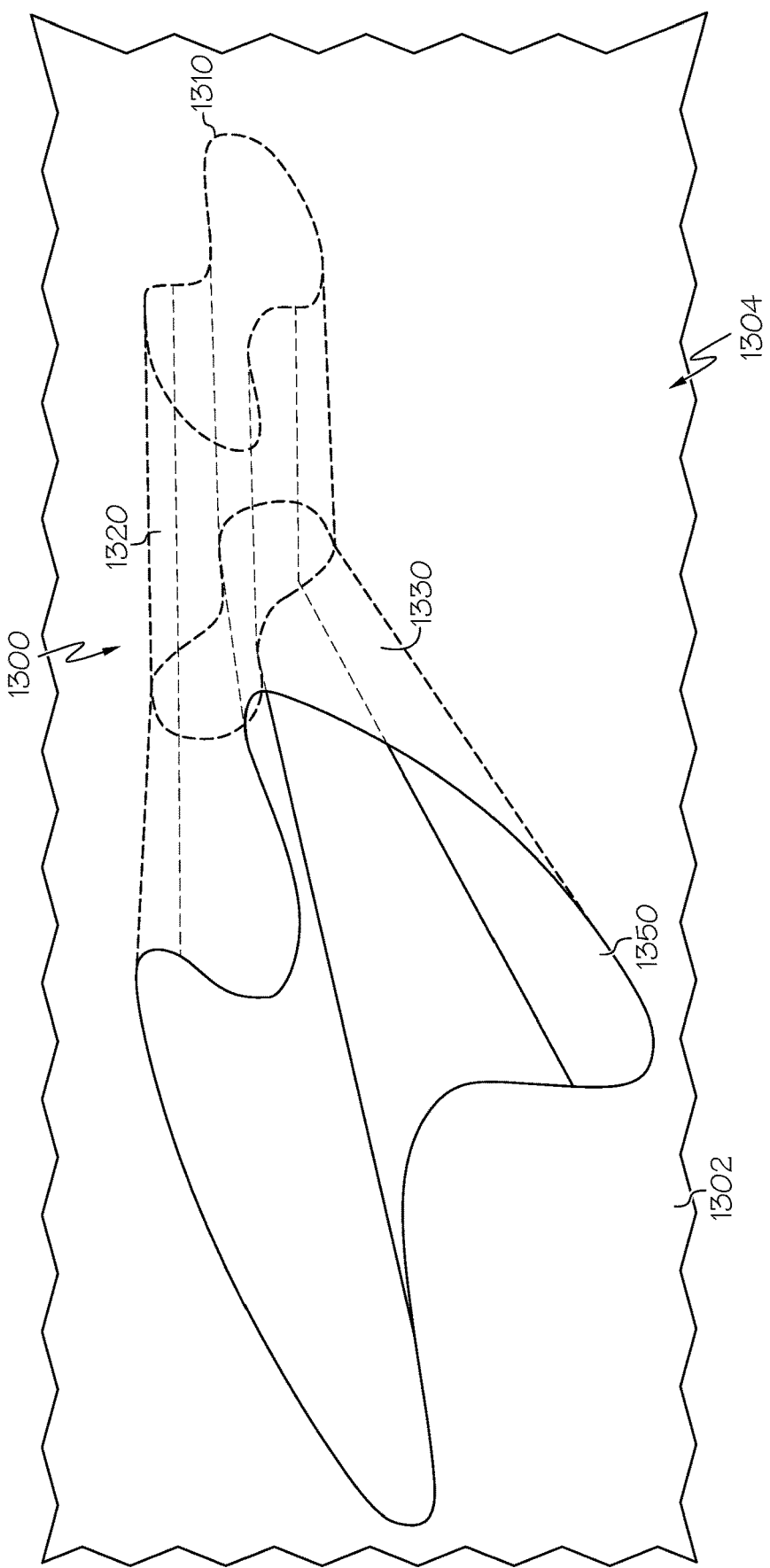
FIG. 13 is an isometric three-dimensional view of a cooling hole in accordance with another exemplary embodiment.
Figure 14:
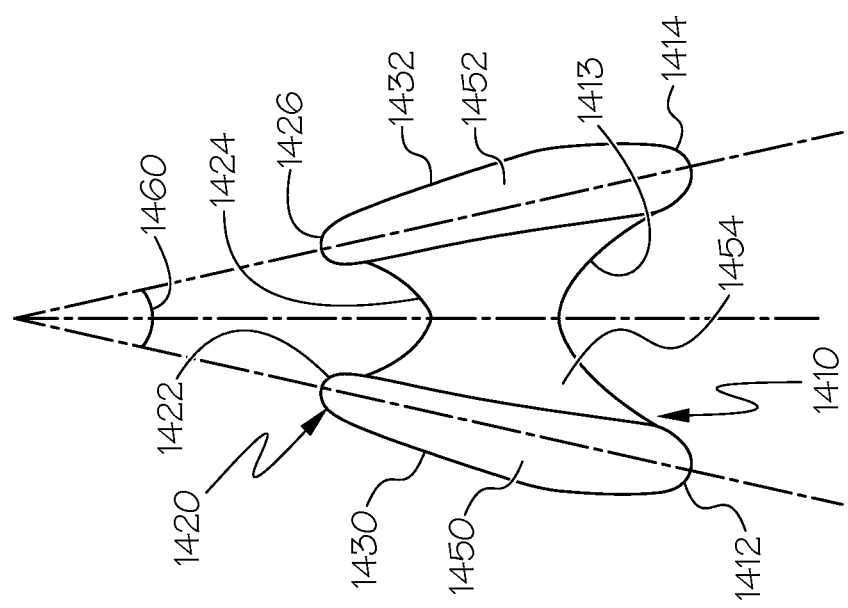
FIG. 14 is a cross-sectional view of a diffuser portion of the cooling hole of FIG. 13 in accordance with another exemplary embodiment.

FIG. 13 is an isometric three-dimensional view of a cooling hole 1300 in accordance with a further exemplary embodiment that provides a cooling flow of air onto an outer surface 1302 of an airfoil 1304. Unless otherwise noted, the cooling hole 1300 may have a configuration such as the exemplary embodiments discussed above, and may be formed in a rotor assembly, stator assembly, and/or compressor component The cooling hole 1300 is considered to have a metering portion 1320 extending from the inlet 1310 and a diffuser portion 1330 extending from the metering portion 1320 to an outlet 1350. The cooling hole 1300 of FIG. 13 is additionally described with reference to FIG. 14. FIG. 14 is a cross-sectional view of the diffuser portion 1330 of the cooling hole 1300 of FIG. 13. Unless otherwise noted, the metering portion 1320 of the cooling hole 1300 may correspond to any of the metering portions described above, e.g., metering portion 800 of FIG. 8 and/or metering portion 900 of FIG. 9.

As noted above, FIG. 14 is a cross-sectional view of the diffuser portion 1330 of the cooling hole 1300 of FIG. 13. In this embodiment, the diffuser portion 1330 may be considered to have a "fan" shape with a multi-curve bottom surface (or floor) 1410, a multi-curve top surface (or ceiling) 1420, and curved or flat sides 1430, 1432. The bottom surface 1410 may include a convex section 1412, a concave section 1413, and a convex section 1414, arranged in sequence between the sides 1430, 1432. As such, the convex sections 1412, 1414 are formed on the edges and in the middle of the bottom surface 1410 and separated by the concave section 1413 to form a "W"-shape. Additional details about this shape are provided below.

The top surface 1420 may be formed by a convex section 1422, a concave section 1424, and a convex section 1426. In one exemplary embodiment, these sections 1422, 1424, 1426 are arranged in sequence between the sides 1430, 1432. The concave section 1424 is arranged in the center of the top surface 1420.

In some respects, as a result of the relative shapes of the bottom and top surfaces 1410, 1420, the diffuser portion 1330 may also be considered to be multi-lobed with a first lobe 1450, a second lobe 1452, and a central lobe or area 1454. From top surface 1420 to bottom surface 1410, the first and second lobes 1450, 1452 may be considered splayed relative to one another at an angle 1460. The angle 1460 may be, as an example, approximately 20-24°. In one exemplary embodiment, the shape of the top surface 1420 of the diffuser portion 1330 may match the top surface of the metering portion 1320. In other words, the radius of curvature of one or more convex and concave sections of the metering portion 1320 may respectively match the radius of curvature of the convex section 1422, concave section 1424, and convex section 1426 of the top surface 1420 of the diffuser portion 1330.

As best shown by FIG. 13, the diffuser portion 1330 expands in cross-sectional area along its length from the metering portion 1320 to the outlet 1350. In one exemplary embodiment, the expansion is constant, although varying rates of expansion may also be provided. Additionally, the bottom surface 1410 of the diffuser portion 1330 may transition from the corresponding shape of the metering portion 1320 in any suitable manner, such as an immediate transition at the intersecting position or gradually along a portion of the length of the diffuser portion 1330.

The angle of expansion of the top surface 1420 of the diffuser portion 1330 between the metering portion 1320 to the outlet 1350 and the angle of expansion of the bottom surface 1410 of the diffuser portion 1330 between the metering portion 1320 to the outlet 1350 may match angle 1460. As noted above, the angle 1460 may be, as an example, approximately 20-24°, although other angles may be provided.

Figure 15:
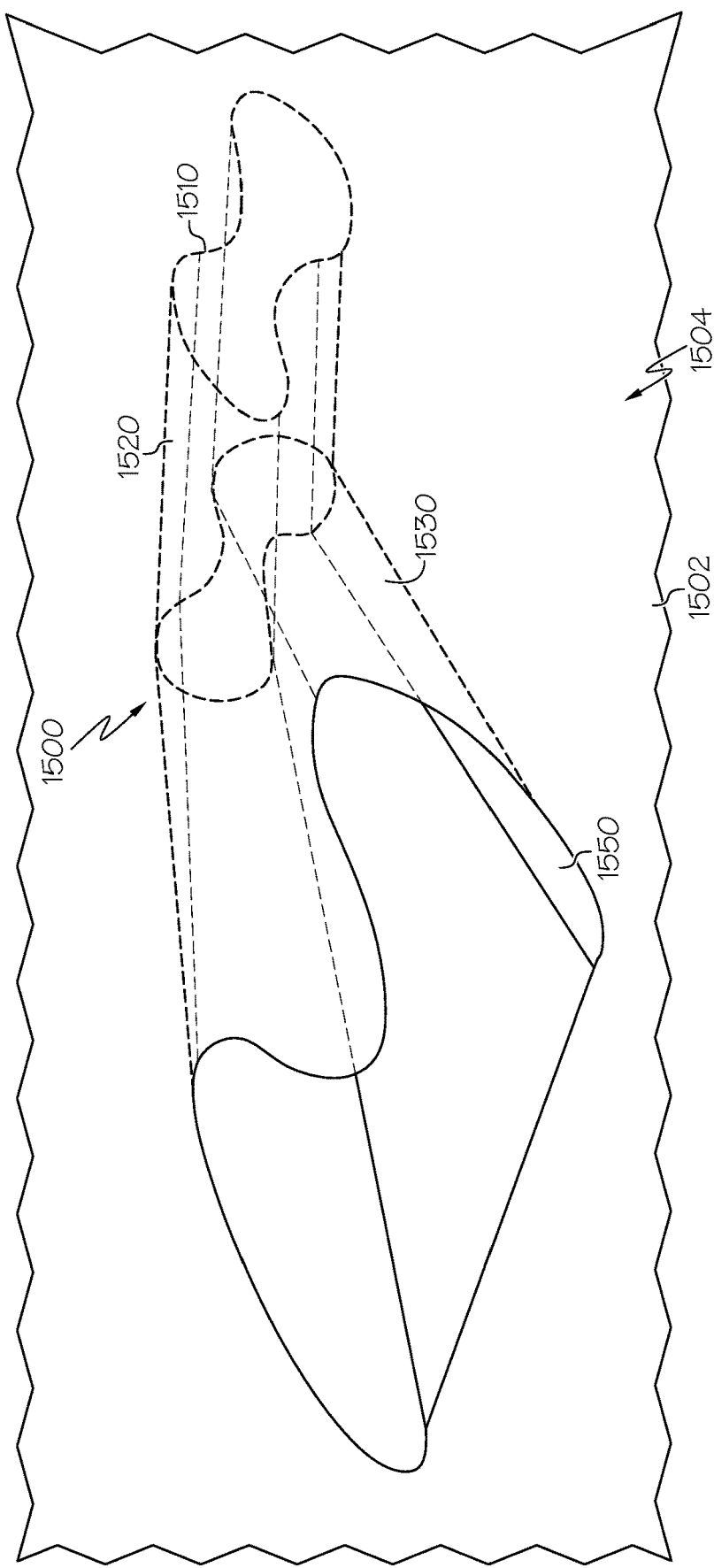
FIG. 15 is an isometric three-dimensional view of a cooling hole in accordance with another exemplary embodiment.
Figure 16:
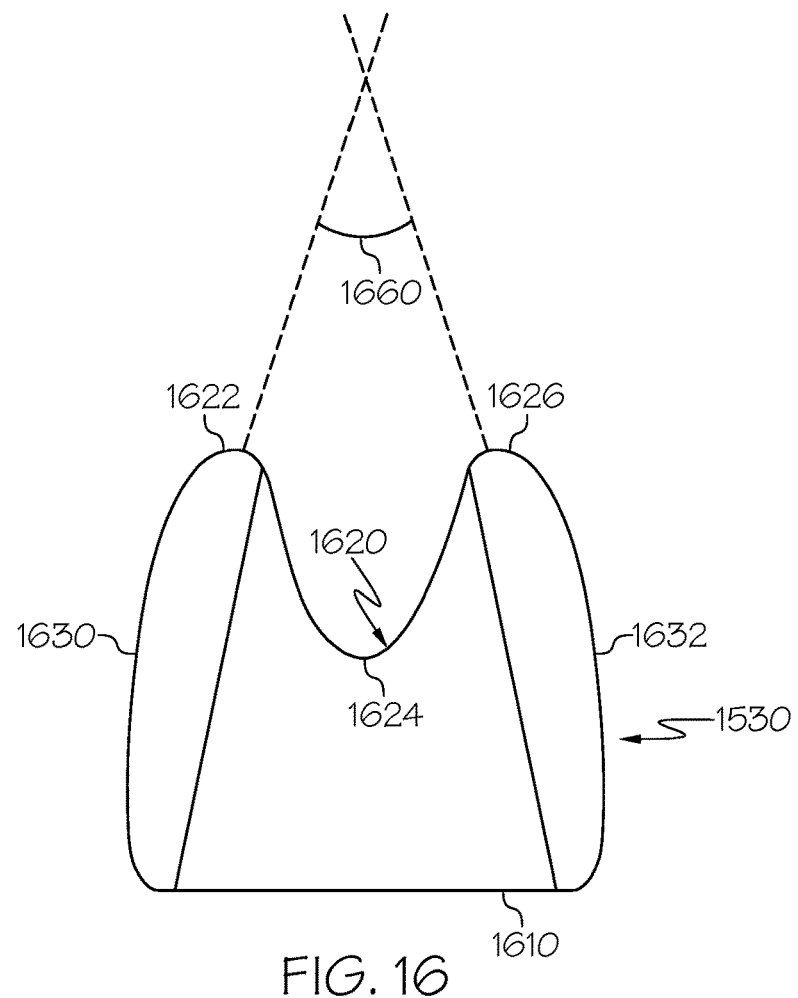
FIG. 16 is a cross-sectional view of a diffuser portion of the cooling hole of FIG. 15 in accordance with another exemplary embodiment.

FIG. 15 is an isometric three-dimensional view of a cooling hole 1500 in accordance with a further exemplary embodiment that provides a cooling flow of air to on an outer surface 1502 of an airfoil 1504. Unless otherwise noted, the cooling hole 1500 may have a configuration such as the exemplary embodiments discussed above, and may be formed in a rotor assembly, stator assembly, and/or compressor component The cooling hole 1500 is considered to have a metering portion 1520 extending from the inlet 1510 and a diffuser portion 1530 extending from the metering portion 1520 to an outlet 1550. The cooling hole 1500 of FIG. 15 is additionally described with reference to FIG. 16. FIG. 16 is a cross-sectional view of a diffuser portion 1530 of the cooling hole 1500 of FIG. 15. Unless otherwise noted, the metering portion 1520 of the cooling hole 1500 may correspond to any of the metering portions described above, e.g., metering portion 800 of FIG. 8 and/or metering portion 900 of FIG. 9

As best shown in FIG. 16, the diffuser portion 1530 may be considered to have a "fan" shape with a flat bottom surface (or floor) 1610, a multi-curve top surface (or ceiling) 1620, and curved or flat sides 1630, 1632. The top surface 1620 may be formed by a convex section 1622, a concave section 1624, and a convex section 1626. In one exemplary embodiment, these sections 1622, 1624, 1626 are arranged in sequence between the sides 1630, 1632. The concave section 1624 is arranged in the center of the top surface 1620. Additional details about this shape are provided below.

As best shown by FIG. 15, the diffuser portion 1530 expands in cross-sectional area along its length from the metering portion 1520 to the outlet 1550. In one exemplary embodiment, the expansion is constant, although varying rates of expansion may also be provided. In one exemplary embodiment, the shape of the top surface 1620 of the diffuser portion 1530 may match the top surface of the metering portion 1520. The angle of expansion of the top surface 1620 of the diffuser portion 1530 between the metering portion 1520 to the outlet 1550 and the angle of expansion of the bottom surface 1610 of the diffuser portion 1530 between the metering portion 1520 to the outlet 1550 may match angle 1660. As noted above, the angle 1660 may be, as an example, approximately 20-24°, although other angles may be provided.

Accordingly, the cooling holes described above generally provide a cooperative arrangement between a metering portion and a diffuser portion. Specifically, the metering portion is shaped such that the momentum or bulk of the cooling air flowing through the hole is directed toward the lateral edges of the holes. As noted above, this is typically accomplished with a reduced cross-sectional area or reduced cross-sectional height along the center line, and correspondingly, increased cross-sectional area(s) or height(s) offset from a longitudinal centerline of the metering portion. The function of the metering portion particularly conditions the air flow for the downstream diffuser portion in which the air flow is diffused along the length of the diffuser portion for enhanced cooling effectiveness. Schematically, this relationship is depicted by FIG. 17, which is an isometric, partially transparent three-dimensional view of a cooling hole 1700 in accordance with an exemplary embodiment.

Figure 17:
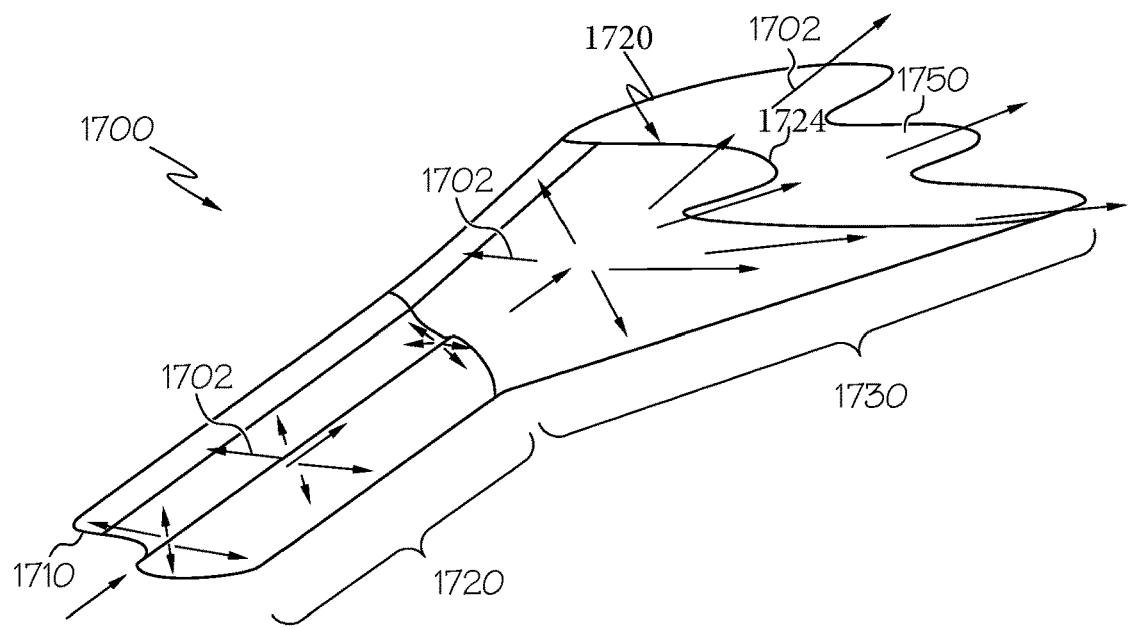
FIG. 17 is an isometric, partially transparent three-dimensional view of a cooling hole in accordance with an exemplary embodiment

Referring to FIG. 17, the cooling hole 1700 has a metering portion 1720 extending from the inlet 1710 and a diffuser portion 1730 extending from the metering portion 1720 to an outlet 1750. Generally, the cooling hole 1700 is similar to the cooling hole 1200 described above in reference to FIG. 12. FIG. 17 additionally includes flow lines 1702 representing air flow characteristics, particularly the direction and relative amount (indicated by line weight) of air flow. As shown, the flow lines 1702 in the metering portion 1720 indicate that the air is being distributed laterally, e.g., from a center flow zone to outer flow zones as described above. Portions of the air remain in the center flow zone, but the air flow continues to migrate into the outer zones in the metering portion 1720 upstream of the diffuser portion 1730. In the diffuser portion 1730 and as indicated by the flow lines 1702, the air is diffused in each direction. The diffuser portion 1730 includes a central concave section 1724 along a top surface 1720. As noted above, the distribution of air flow along the outer zones enables an enhancement of the lateral diffusion along the sides of the diffuser portion 1730 and along the surface of the airfoil after exiting the outlet 1750. In particular, as the cooling flow enters the diffuser portion 1730, the flow already has a beneficial lateral distribution such that the flow does not need as much lateral diffusion as would otherwise be required. Thus, there is an improved film cooling and less propensity for flow separation on the diffuser lateral walls to provide more robust cooling. The enhancement of the cooling performance relative to alternative arrangements is demonstrated by the graph 1800 of FIG. 18.

Figure 18:
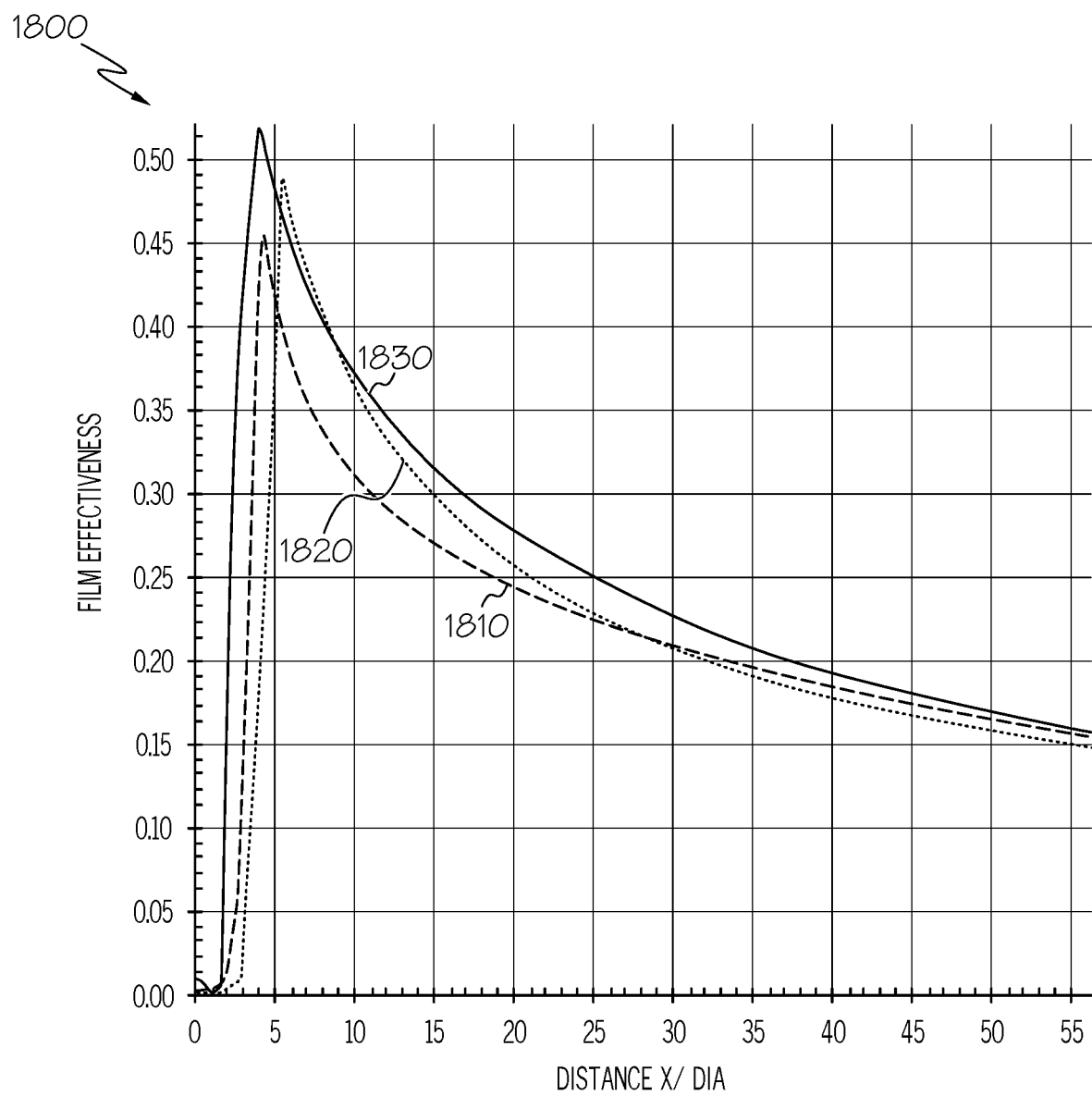
FIG. 18 is a graph depicting the performance of cooling holes according to exemplary embodiments compared to other types of cooling holes.

FIG. 18 is a graph 1800 depicting the performance of cooling holes according to exemplary embodiments compared to other types cooling holes. Generally, the cooling holes referenced in FIG. 18 may correspond to any of the cooling holes described above.

The graph 1800 depicts film cooling effectiveness on the y-axis as a function of distance from the outlet of the hole on the x-axis. The effectiveness is represented by three lines, each corresponding to a different hole configuration. Line 1810 corresponds to a hole with a cylindrical metering portion and a lateral diffuser portion. Line 1820 corresponds to a hole with a racetrack or oval metering portion and a lateral diffuser portion. Line 1830 corresponds to a hole with a tailored metering portion (e.g., the metering portion of FIG. 8 or FIG. 9) and a lateral diffuser portion (e.g., the diffuser portion of FIG. 11, FIG. 14, or FIG. 16). As such, line 1830 corresponds to the cooling holes described above, while lines 1810, 1820 correspond to other types of cooling hole arrangements.

As represented by the relative differences between lines 1810, 1820, 1830, exemplary embodiments (e.g., line 1830) provide an improvement in film effectiveness relative to the other configurations (e.g., lines 1810, 1820). In one exemplary embodiment, the exemplary embodiments may improve the laterally averaged film effectiveness by over 20%. This may result in a temperature improvement on the surface of the airfoil of approximately 20°–40° F., thereby enabling at least a doubling of component life, as one example.

In general, the cooling holes discussed above provide metering portions that laterally diffuse (or distribute) air flow to the edges within the metering portion itself. This functions to advantageously condition the air prior to a downstream diffuser portion leading to the hole outlet. As a result of the lateral migration in the metering portion, the lateral diffusion in the diffuser portion is improved to thereby improve overall performance of the hole. This arrangement facilitates the even distribution of the cooling air substantially completely over the outer surface of an airfoil, e.g. a stator, rotor, or compressor airfoil. In particular, the cross-sectional shapes and configurations of the exemplary cooling holes, both within interior and at the surface, function as forward and lateral diffusers to reduce the velocity and increase static pressure of the cooling airstreams exiting the holes and encourage cooling film development. The holes additionally decrease peak velocities, and improve adiabatic effectiveness across a number of blowing ratios. These airstreams are more inclined to cling to the surface for improved cooling rather than separate from the surface to produce an enhanced cooling effect at the surface. Consequently, exemplary embodiments promote the service life of the airfoil as a result of a more uniform cooling film at the external surfaces.

As a group, the cooling holes may be formed in a selected pattern or array to provide optimum cooling. Computational fluid dynamic (CFD) analysis can additionally be used to optimize the shape, dimensions, locations and orientations of the cooling holes. The cooling holes may be formed by casting, abrasive water jet, electro discharge machining (EDM), laser drilling, additive manufacturing techniques, or any suitable process.

Exemplary embodiments disclosed herein are generally applicable to air-cooled components, particularly those that are to be protected from a thermally and chemically hostile environment. Notable examples of such components include the high and low pressure turbine vanes and blades, shrouds, combustor liners and augmenter hardware of gas turbine engines. The advantages are particularly applicable to gas turbine engine components that employ internal cooling to maintain the service temperature of the component at an acceptable level while operating in a thermally hostile environment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine component, comprising:
  a body having an internal surface and an external surface, the internal surface at least partially defining an internal cooling circuit; and
  a plurality of cooling holes formed in the body and extending between the internal cooling circuit and the external surface of the body, the plurality of cooling holes including a first cooling hole configured to receive a cooling fluid flow, the first cooling hole comprising:
    a metering portion with a constant cross-sectional area and a cross-sectional shape having a maximum height that is offset relative to a longitudinal centerline of the metering portion, the metering portion with the constant cross-sectional area extending from an inlet on the internal surface to a diffuser portion, the inlet configured to receive the cooling fluid flow, the metering portion inclined relative to the external surface of the body at an angle of 20°-45° to define the cross-sectional shape, the metering portion having a metering portion top surface, a metering portion bottom surface, and metering portion sides that join the metering portion top surface to the metering portion bottom surface, the metering portion top surface includes a central concave section relative to the first cooling hole that cooperates with the metering portion bottom surface to define a center flow zone through the metering portion, and the metering portion bottom surface includes a concave section relative to the first cooling hole or a flat section, the metering portion extending along the longitudinal centerline; and the diffuser portion extending from the metering portion to the external surface of the body and defining an outlet at the external surface, the diffuser portion to receive the cooling fluid flow from the metering portion, the diffuser portion having a diffuser portion top surface, a diffuser portion bottom surface, and diffuser portion sides that join the diffuser portion top surface to the diffuser portion bottom surface, the diffuser portion top surface including a diffuser central concave section downstream from a diffuser first convex section and a diffuser second convex section at the outlet, the diffuser portion extends along an axis oblique to the longitudinal centerline, and the diffuser portion top surface is inclined at a forward angle relative to the metering portion such that the diffuser central concave section of the diffuser portion top surface extends into the center flow zone to direct the cooling fluid flow from the center flow zone toward the diffuser portion sides, the diffuser portion bottom surface includes a diffuser third convex section and a diffuser fourth convex section downstream from a diffuser central convex section at the outlet, the diffuser central convex section connected to the diffuser third convex section and the diffuser fourth convex section by a respective concave section, the diffuser first convex section connected to the diffuser third convex section by one of the diffuser portion sides and the diffuser second convex section connected to the diffuser fourth convex section by another of the diffuser portion sides, the diffuser portion includes a second maximum height defined between the diffuser first convex section and the diffuser third convex section, a central height defined between the diffuser central concave section and the diffuser central convex section, the central height less than the second maximum height, and the second maximum height is offset from the axis.

2. The engine component of claim 1, wherein the metering portion is at least 25% of an entire length of the first cooling hole.

3. The engine component of claim 1, wherein the metering portion intersects with the diffuser portion within the middle half of the first cooling hole.

4. The engine component of claim 1, wherein the diffuser portion is a multi-lobed shape.

5. The engine component of claim 4, wherein the multi-lobed shape has at least three lobes.

6. The engine component of claim 1, wherein the cross-sectional shape of the metering portion has a center height on the longitudinal centerline, a first offset diameter that corresponds to the maximum height, and a second offset diameter that corresponds to the maximum height.

7. The engine component of claim 6, wherein a ratio of the center height to the maximum height is less than 0.9 to 1.

8. A turbine section of a gas turbine engine, comprising:
a housing defining a hot gas flow path;
a plurality of circumferential rows of airfoils disposed in the hot gas flow path, each airfoil defining an inner surface and an outer surface; and
a plurality of cooling holes arranged within at least one of the plurality of circumferential rows of airfoils and configured to receive a cooling fluid flow, wherein a first cooling hole of the plurality of cooling holes is defined by:

a metering portion with a constant cross-sectional area and a cross-sectional shape having a maximum height that is offset relative to a longitudinal centerline of the metering portion, the metering portion with the constant cross-sectional area extending from an inlet on the internal surface to a diffuser portion, the inlet configured to receive the cooling fluid flow, the metering portion inclined relative to the external surface of the body at an angle of 20°-45° to define the cross-sectional shape, the metering portion having a metering portion top surface, a metering portion bottom surface, and convex metering portion sides that join the metering portion top surface to the metering portion bottom surface, the metering portion top surface includes a central concave section relative to the first cooling hole, a first convex section and a second convex section, the first convex section and the second convex section cooperate with the metering portion bottom surface to define outer flow zones through the metering portion and the central concave section cooperates with the metering portion bottom surface to define a center flow zone through the metering portion, the maximum height defined between the first convex section and the metering portion bottom surface and between the second convex section and the metering portion bottom surface to direct the cooling fluid flow to the outer flow zones, the metering portion extending along the longitudinal centerline and the outer flow zones are offset from the longitudinal centerline; and the diffuser portion extending from the metering portion to the outer surface of the airfoil and defining an outlet at the outer surface, the diffuser portion to receive the cooling fluid flow from the metering portion, the diffuser portion having a diffuser portion top surface, a diffuser portion bottom surface, and diffuser portion sides that join the diffuser portion top surface to the diffuser portion bottom surface, the diffuser portion top surface including a diffuser central concave section downstream from a diffuser first convex section and a diffuser second convex section at the outlet, the diffuser portion bottom surface including a diffuser third convex section and a diffuser fourth convex section downstream from a diffuser central convex section at the outlet, the diffuser central convex section connected to the diffuser third convex section and the diffuser fourth convex section by a respective concave section, the diffuser first convex section connected to the diffuser third convex section by one of the diffuser portion sides and the diffuser second convex section connected to the diffuser fourth convex section by another of the diffuser portion sides, the diffuser portion including a second maximum height defined between the diffuser first convex section and the diffuser third convex section, a central height defined between the diffuser central concave section and the diffuser central convex section, the central height less than the second maximum height, the diffuser portion extends along an axis oblique to the longitudinal centerline and the second maximum height is offset from the axis, and the diffuser portion top surface is inclined at a forward angle relative to the metering portion such that the diffuser central concave section of the diffuser portion top surface extends into the center flow zone to direct the cooling fluid flow from the center flow zone toward the diffuser portion sides.

9. The turbine section of claim 8, wherein the cross-sectional shape of the metering portion has a center height on the longitudinal axis centerline, a first edge diameter that corresponds to the maximum height, and a second edge diameter that corresponds to the maximum height.

10. The turbine section of claim 9, wherein a ratio of the center height to the maximum height is less than 0.9 to 1.

11. The engine component of claim 1, wherein the diffuser portion is inclined relative to the external surface of the body at an angle of 20°-45° to define a cross-sectional shape, wherein the diffuser portion sides are splayed relative to one another from the diffuser portion top surface to the diffuser portion bottom surface.

12. The engine component of claim 11, wherein the diffuser portion sides are splayed relative to one another from the diffuser portion top surface to the diffuser portion bottom surface at an angle of 20°-24°.

13. The turbine section of claim 8, wherein the diffuser portion is inclined relative to the external surface of the body at an angle of 20°-45° to define a cross-sectional shape, wherein the diffuser portion sides are splayed relative to one another from the diffuser portion top surface to the diffuser portion bottom surface.

14. The turbine section of claim 13, wherein the diffuser portion sides are splayed relative to one another from the diffuser portion top surface to the diffuser portion bottom surface at an angle of 20°-24°.

* * * * *